United States Patent
Fujii et al.

(10) Patent No.: US 8,570,623 B2
(45) Date of Patent: Oct. 29, 2013

(54) DEEP FOCUS IMAGE READING SYSTEM AND IMAGE FORMING APPARATUS

(75) Inventors: Takashi Fujii, Yokohama (JP); Hiroshi Kubo, Kawasaki (JP); Tatsuaki Nagano, Yokohama (JP); Takeshi Akai, Yokohama (JP); Yasuo Kosuga, Kawasaki (JP); Kenichiro Morita, Fujisawa (JP)

(73) Assignee: Ricoh Company, Ltd., Tokyo (JP)

( * ) Notice: Subject to any disclaimer, the term of this patent is extended or adjusted under 35 U.S.C. 154(b) by 767 days.

(21) Appl. No.: 12/659,257

(22) Filed: Mar. 2, 2010

(65) Prior Publication Data

US 2010/0225983 A1 Sep. 9, 2010

(30) Foreign Application Priority Data

Mar. 4, 2009 (JP) .................................. 2009-050881

(51) Int. Cl.
*H04N 1/04* (2006.01)

(52) U.S. Cl.
USPC ............ 358/498; 358/496; 358/497; 358/474

(58) Field of Classification Search
USPC .......... 358/496, 498, 497, 474; 399/361, 367; 382/312, 318, 319
See application file for complete search history.

(56) References Cited

U.S. PATENT DOCUMENTS

| 4,825,255 A | * | 4/1989 | Iaia et al. ................. 355/76 |
| 4,831,419 A | * | 5/1989 | Iaia et al. ................. 355/76 |
| 5,463,451 A | * | 10/1995 | Acquaviva et al. ........ 399/211 |
| 7,367,667 B2 | * | 5/2008 | Kudoh et al. ............... 347/104 |
| 7,495,810 B2 | * | 2/2009 | Shiraishi ................. 358/474 |
| 7,515,312 B2 | * | 4/2009 | Murakami et al. ......... 358/461 |
| 7,589,871 B2 | * | 9/2009 | Yoshimoto et al. ......... 358/496 |
| 8,018,631 B2 | * | 9/2011 | Kagami .................... 358/498 |
| 8,351,096 B2 | * | 1/2013 | Sagara ..................... 358/496 |
| 2008/0297856 A1 | * | 12/2008 | Orita ....................... 358/496 |

FOREIGN PATENT DOCUMENTS

| JP | 5-110765 | | 4/1993 |
| JP | 3573884 | | 7/2004 |
| JP | 2005123915 A | * | 5/2005 |
| JP | 2007-159033 | | 6/2007 |
| JP | 2008-124623 | | 2/2008 |

OTHER PUBLICATIONS

Abstract of JP 10-133299 published on May 22, 1998.

* cited by examiner

*Primary Examiner* — Cheukfan Lee
(74) *Attorney, Agent, or Firm* — Harness, Dickey & Pierce, P.L.C.

(57) ABSTRACT

An image reading system reads an image of an original document by conveying the original document through a fixed reading position along a platen glass. The image reading system includes a conveyance device that conveys the original document keeping a prescribed distance from the platen glass at the reading position. The contact glass is arranged outside a depth of focus at the reading position.

19 Claims, 16 Drawing Sheets

DEEP FOCUS IMAGE READING SYSTEM AND IMAGE FORMING APPARATUS

CROSS REFERENCE TO RELATED APPLICATION

This application claims priority under 35 USC §119 to Japanese Patent Application No. 2009-050881, filed on Mar. 4, 2009, the entire contents of which are herein incorporated by reference

BACKGROUND OF THE INVENTION

1. Field of the Invention

The present invention relates to a sheet through type image reading device and a copier having the sheet through type image reading device.

2. Discussion of the Background Art

An image reading device capable of sub scanning an image on an original document by conveying the original document through a fixed reading position is well known. A platen glass is arranged at the reading position to allow a light emitted from a light source arranged inside the image reading position to pass toward the original document located outside thereof and a light reflected from the original document toward the inside thereof. Since the original document passes there through contacting the platen glass in this type of the image reading device during reading the image of the original document, dust sticking to the image surface on the original document unavoidably attracts to the platen glass, and thereby an image signal read therefrom is influenced and an image is deteriorated as a result. This also deteriorates quality of an image formed by another type of an image reading device than the sheet through type. When the original document is fixed and the image reading section is moved in a sub scanning direction to read an image thereof, the dust only causes a spot on the image. Whereas when the sheet through type image reading device is employed, a line is drawn in the direction by the dust.

It is described in the Japanese Patent Registration No. 3573884 and the Japanese Patent Application Laid Open No. 2007-159033 that an original document is conveyed through a reading position keeping a prescribed gap from a platen glass and is read by the image reading device. In such a configuration, the original document can be conveyed avoiding sliding contact with the platen glass. As a result, dust or the like can be prevented from dropping from the image surface side of the original document and attracting to the platen glass at the reading position. Accordingly, the line hardly appears on the image while maintaining the quality thereof.

However, in the above-mentioned several prior arts, the dust or the like dropped therefrom during its conveyance sometimes attracts to the reading position on the platen glass and draws the line on the image.

SUMMARY OF THE INVENTION

The present invention has been made in view of the above noted and another problems and one object of the present invention is to provide a new and noble image reading device for reading an original document image while conveying an original document through a fixed reading position along a platen glass.

Such new and noble image reading device, comprises a conveyance device configured to convey the original document keeping a prescribed distance from the platen glass at the reading position, wherein the contact glass is arranged at a position other than a depth of focus at the reading position.

In another aspect, the conveyance device includes a guide belt configured to travel in an original document conveyance direction with its surface facing the platen glass at the reading position. An absorption device is provided to absorb the original document to the guide belt.

In another aspect, the absorption device employs latent static attracting force.

In yet another aspect, the absorption device employs air suction attracting force.

In yet another aspect, a lifting device is provided to lift the guide belt in relation to the original document conveyance surface. A thickness detection device is provided to detect a thickness of the original document on conveyance. The guide belt is lifted in accordance with a detection result of the detection device.

In yet another aspect, a shading correction device is provided to execute shading correction using the surface of the guide belt. The guide belt is vertically lifted when the shading correction is executed.

In yet another aspect, the guide belt is retracted inside either when the guide belt is exposed or when reading of the original document is completed.

In yet another aspect, the conveyance device includes an upstream side guide member arranged in the vicinity and upstream of the reading position. The upstream side guide member includes a pair of upper and lower guide plates collectively serving as an upstream side conveying path. The conveyance device further includes a downstream side guide member arranged in the vicinity and downstream of the reading position. The downstream side guide member includes a pair of upper and lower guide plates collectively serving as a downstream side conveying path. A gap is formed between the lower guide plates of the respective upstream and downstream side guide members, and is larger than that needed for the reading section to read the image of the original document. The gap is smaller than a prescribed level so that the original document conveying path does not deviate from the depth of focus at the reading position.

In yet another aspect, the gap is a slit shape.

In yet another aspect, the gap is a taper shape, a diameter of which is increasing toward the platen glass.

In yet another aspect, the upper guide plates are attached to the casing.

In yet another aspect, the casing is attached to an image reading unit having the platen glass and the reading section. The upper guide plates are freely swingably mounted to the casing.

In yet another aspect, the upper guide plates automatically swing when the casing is open.

In yet another aspect, a restriction device is provided to restrict automatic swinging of the upper guide plates.

In yet another aspect, a positioning protrusion is provided to contact and position the upper guide plates when the casing is closed. The positioning protrusion is attached to the casing.

In yet another aspect, the up and downstream side guide members are substantially entirely transparent.

In yet another aspect, the up and downstream side guide members are partially transparent at sections in the vicinity of the reading position in the entire main scanning direction.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein.

PREFERRED EMBODIMENTS OF THE PRESENT INVENTION

Figure 1:
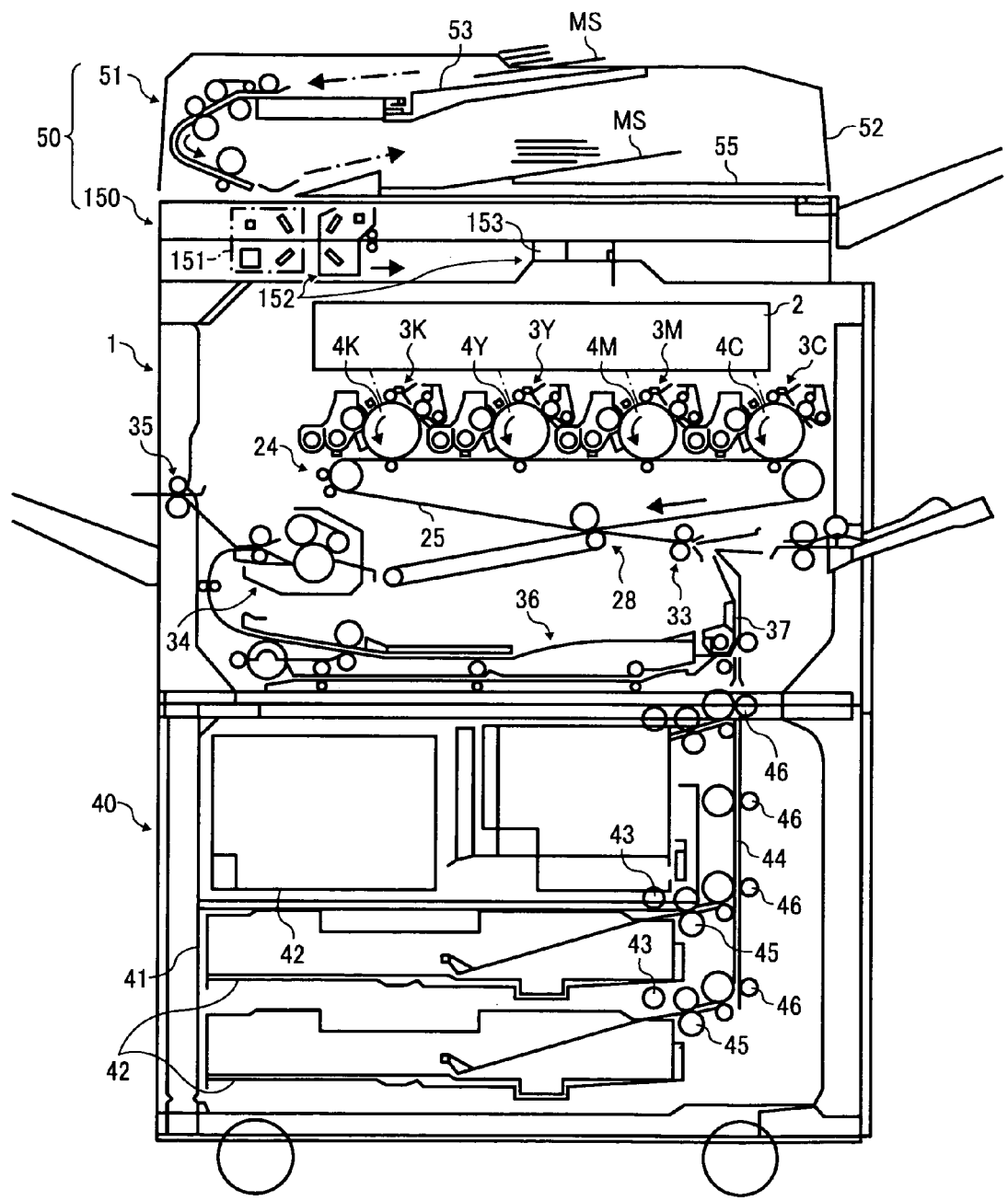
FIG. 1 schematically illustrates an exemplary copier according to one embodiment of the present invention.

Referring now to the drawings, wherein like reference numerals and marks designate identical or corresponding parts throughout several figures, in particular in FIG. 1, an exemplary copier is illustrated. As shown, the copier includes an image formation section 1 serving as an image formation device, a blank sheet supplying device 40 and an original document reading device 50. The original document reading device 50 includes a scanner 150 serving as an image reading unit secured to the image formation section 1 from above and an ADF 51 serving as a conveyance device which is supported by the scanner 150.

A blank sheet supplying device 40 includes a pair of sheet feeding cassettes 42 arranged stepwise in a paper bank 41, a launching roller 43 that launches a transfer sheet from the sheet feeding cassettes, and a separation roller 45 that separates and supplies the transfer sheets toward a sheet path 44. Further, plural conveyance rollers 47 that convey the transfer sheet toward the sheet-feeding path 37 of the image formation section 1 are provided. Then, the transfer sheet in the sheet-feeding cassette is fed into the sheet-feeding path 37 in the image formation section 1.

Now, an exemplary interior of the image formation section is described with reference to FIG. 2. The image formation section 1 includes four process units 3K to 3C (black, yellow, magenta, and cyan) for forming toner images of component colors of K to C, a transfer unit 24, a sheet conveyance unit 28, a registration roller pair 33, a fixing device 34, a switchback device 36, a sheet feeding path 37 and the like. A light source such as a laser diode, a LED, etc., not shown, arranged in an optical write device 2 is driven to emit laser lights L to drum state photoconductive members 4K to 4C, respectively. With this emission, latent images are formed on the respective surfaces of the photoconductive members 4K to 4C, and are developed into toner images through prescribed developing processes.

The process units 3K to 3C accommodate photoconductive members and various peripheries arranged there around on respective supporting members as units, and are detachable to a body of the image formation section 1. For example, in the black use process unit 3K, a developing device 6K is included beside the photoconductive member 4K to develop a latent image formed on a photoconductive member 4K into a black toner image. Further included is a cleaning device 15 and the like for cleaning the surface of the photo-conductive member 4K by removing toner attracting thereto at a position where the surface passes through a primary transfer nip for K-use as mentioned later in detail. In this copier, these four process units 3K to 3C are arranged side by side each opposing an intermediate transfer belt 25 in a traveling direction thereof in a tandem state.

Figure 3:
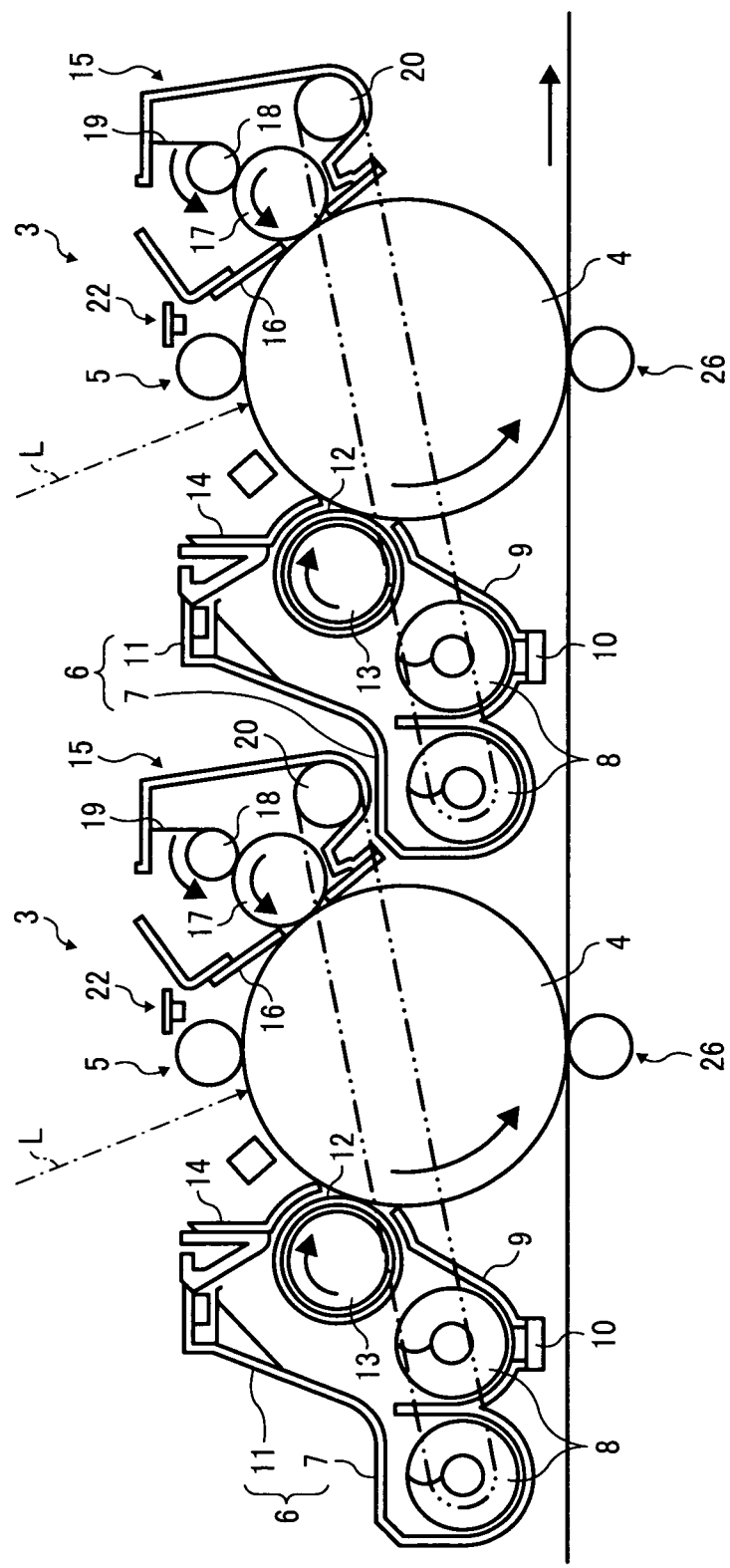
FIG. 3 partially illustrates an exemplary tandem type four process units provided in the image formation section of the copier of FIG. 1.

Now, the tandem type four process units 3K to 3C are described with reference to FIG. 3. Each of the four process units 3K to 3C has substantially the same configuration with each other and employs different color component toner. As shown, the process unit 3 includes a charge device 23, a developing device 6, a drum cleaning device 15, and a charge removing lamp 22 and the like around the photo-conductive member 4.

The photoconductive member 4 is produced from a rough tube made of such as aluminum and a photoconductive layer made of organic photoconductive material having photoconductive performance coated overlying the tube as a drum. An endless belt type can be alternatively used.

The developing device 6 develops a latent image with two component developers including magnetic carrier and non-magnetic toner. The developing device 6 includes a stirring section 7 that conveys and supplies the two-component developer accommodated therein to a developing sleeve 12 while stirring thereof. Also included is a developing section 11 that transfers toner in the two-component developer carried on the developing sleeve 12 onto the photoconductive member 4.

The stirring section 7 is located at a lower position than the developing section 11, and includes a pair of conveyance screws 8 arranged in parallel to each other, a partition arranged between the screws, and a toner density sensor 10 arranged on a bottom surface of a developing casing and the like.

The developing section 11 includes a developing sleeve 12 opposing the photo-conductive member 4 via an opening of the developing casing 9, a magnetic roller 13 fixed inside, and a doctor blade 14 abutting on the developing sleeve via its leading end and the like. The developing sleeve 12 is made of non-magnetic material and has a rotatable cylindrical shape. The magnetic roller 12 includes plural magnetic poles arranged side by side in a rotational direction from a position opposing a doctor blade 14. These magnetic poles provide magnetic force to the two-component developer on the sleeve at a prescribed position in the rotational direction and pulls and carries the two-component developer transferred from the stirring section 7 on the surface of the developing sleeve 13, so that a magnetic brush is formed thereon along the magnetic lines.

The magnetic brush is flattened to have a prescribed thickness when passing through the doctor blade 14 as the developing sleeve rotates, and is conveyed to a developing region opposing the photoconductive member 4. Then, the magnetic brush causes toner to move to the latent image and contributes to development due to a developing bias applied to the developing sleeve 12 and a potential difference created between the photoconductive member 4 and the latent image. Further, the toner returns to the developing section 11 as the developing sleeve 12 rotates and is separated from the surface of the sleeve due to influence of a repelling magnetic field created between the magnetic poles of the magnetic roller 13. Based on a detection result of the toner density sensor 10, a prescribed amount of the two-component developer is replenished to the stirring section 7. Further, instead of the two-component developer, one component developer can be used in the developing device 6.

The cleaning blade 16 made of polyurethane contacting the photoconductive member 4 is used in the drum cleaning device 15. However, the other system can be used. For the purpose of increasing a cleaning performance, a fur brush 17 having a contact conductivity is employed to freely swingably contact the photoconductive member 4 via its outer circumference in a direction as shown by an arrow in the drawing. The fur brush 17 shaves a solid lubricant agent member, not shown, into fine particles, and coats the surface of the photoconductive member 4 therewith. An electric filed roller 18 made of metal is freely swingably arranged in a direction as shown by an arrow in the drawing, to which a tip of a scraper 19 pressure contacts. The toner attracting to the fur brush 17 is transferred onto the electric field roller 18, which receives a bias and rotates counter clockwise contacting the fur brush 17. After being scraped off from the electric field roller 18 by the scraper 19, the toner drops on a collection screw 20. The collection screw 20 conveys the toner toward an end of the drum cleaning device 15 in a direction perpendicular to the surface of the drawing, and hands the same to a recycle conveyance device 21 arranged outside thereof. The recycle conveyance device 21 transfers the toner to the developing device 15 to be recycled.

The charge removing lamp 22 removes charge on the surface of the photoconductive member 4 by emitting a light. The surface is then uniformly charged by the charge device 23, and is subjected to optical writing by the optical writing device 2. The charge device 23 employs a rotatable charge roller receiving a charge bias contacting the photoconductive member 4. Otherwise, a scorotron charge or the like of a non-contact type can be employed separated from the photoconductive member 4.

Figure 2:
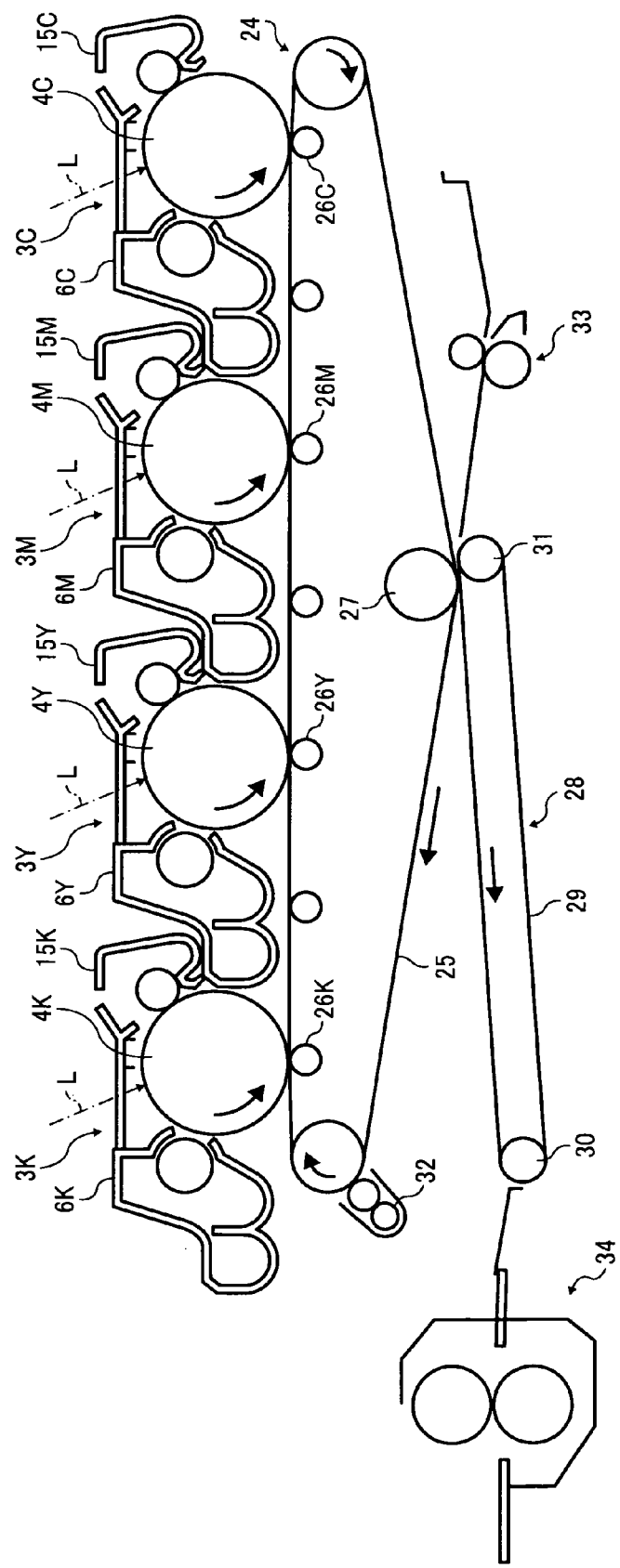
FIG. 2 partially illustrates an exemplary interior of an image formation section of the copier of FIG. 1.

K to C mono color toner images created by the above-mentioned manner are respectively formed on the photoconductive members 4K to 4C in the four process units 3K to 3C as shown in FIG. 2.

Below the four process units 3K to 3C, a transfer unit 24 is arranged, and includes an endless intermediate transfer belt that is wound around plural rollers and rotates clockwise in the drawing while contacting the photo-conductive members 4K to 4C. Thus, plural primary nips for K to C uses are formed between the respective photoconductive members 4K to 4C and the intermediate transfer belt 25. In the vicinity of the primary nips for K to C uses, plural primary transfer rollers 26K to 26C arranged inside the belt lop depress the intermediate transfer belt 25 against the photo-conductive members 4K to 4C. These primary transfer rollers 26K to 26C receive a primary transfer bias from a power supply, not shown. Thus, plural primary transfer electric fields are created in the primary nips for K to C uses to electro statically move toner images on the photoconductive members 4k to 4C toward the intermediate transfer belt 25. Thus, as the intermediate transfer belt 25 endlessly moves clockwise and passes through the respective transfer nips, the toner images are superimposed there one by one on the front surface thereof, so that a four color superimposed toner image is formed thereon.

Below the transfer unit 24, a sheet transfer unit 28 is arranged, which includes an endless sheet conveyance belt 29 wound around driving and secondary transfer rollers 30 and 31. The secondary transfer roller 31 of the sheet transfer unit 28 and the lower section suspension roller 27 sandwiches the intermediate transfer belt and the sheet conveyance belt 29. Thus, a secondary transfer nip is created, in which the front surfaces of the intermediate transfer belt 25 and the sheet conveyance belt 29 contact each other. The secondary transfer roller 31 receives a secondary transfer bias from a power supply, not shown. The lower section suspension roller 27 is grounded. Thus, a secondary transfer electric field is created in the secondary transfer nip.

On the right side of the secondary transfer nip, a registration roller pair 33 is arranged to launch a transfer sheet pinched between rollers toward the secondary transfer nip in synchronism with the four color toner image on the intermediate transfer belt 25. In the secondary transfer nip, a four color superimposed toner image on the intermediate transfer belt 25 is transferred at once onto the transfer sheet under influence of the secondary transfer electric field as a full color image on a blank sheet. The transfer sheet passing through the secondary transfer nip is separated from the intermediate transfer belt 25, and is conveyed toward the fixing device 34 being held on the front surface of the sheet conveyance belt 29.

Toner not transferred onto the transfer sheet at the secondary transfer nip remains on the front surface of the intermediate transfer belt 25 passing through the secondary transfer nip, and is removed by a cleaning device contacting the intermediate transfer belt 25.

The transfer sheet conveyed to the fixing device 34 is subjected to a fixing process for fixing the full color image, which is executed by providing pressure and heat therein. The transfer sheet is conveyed and ejected outside the apparatus by the sheet ejection roller pair 35.

Back to FIG. 1, a switch back device 36 is arranged below the sheet conveyance unit 22 and the fixing device 34. Thus, a switching pick changes a course of the transfer sheet that has completed the image fixing process on its one side toward a transfer sheet inversion device. Then, the transfer sheet is inverted there and enters the secondary transfer nip. When the other side surface receives the secondary transfer and fixing processes, it is ejected onto the sheet ejection tray.

The scanner 150 secured to the image formation section 1 includes a secured reading section and a movement reading section 152. The movement reading section 152 is arranged right below the contact glass, fixed to the upper wall of the casing of the scanner 150 so as to contact an original document MS. Thus, an optical system including a light source and reflection mirrors and the like can be moved left and right in the drawing. When the optical system is moved to right from left, the light emitted from the light source is reflected by an original document placed on a second contact glass. The light travels reflection mirrors and enters an image reading sensor 153 fixed to the scanner body to be received.

On the other hand, the fixed reading section includes a fixed first surface reading section 151 arranged in the scanner 150 and a fixed second surface reading section 95, not shown, arranged in the ADF 51. The fixed first surface reading section 151 includes a light source, reflection mirrors, a CCD and the like, and is arranged right below the platen glass 154, not shown, secured to the upper wall of the casing of the scanner 150. Thus, when the original document MS conveyed by the ADF 51 passes through above the platen glass, the light emitted from the light source is reflected in turn by the plural reflection mirrors, so that the light is received by an image reading sensor. Thus, without moving the optical system of the light source and the reflection mirrors, the first surface of the original document is scanned. Further, the fixed second surface reading section 95 scans the second surface of the original document MS having passed through the fixed first surface reading section 151.

Figure 4:
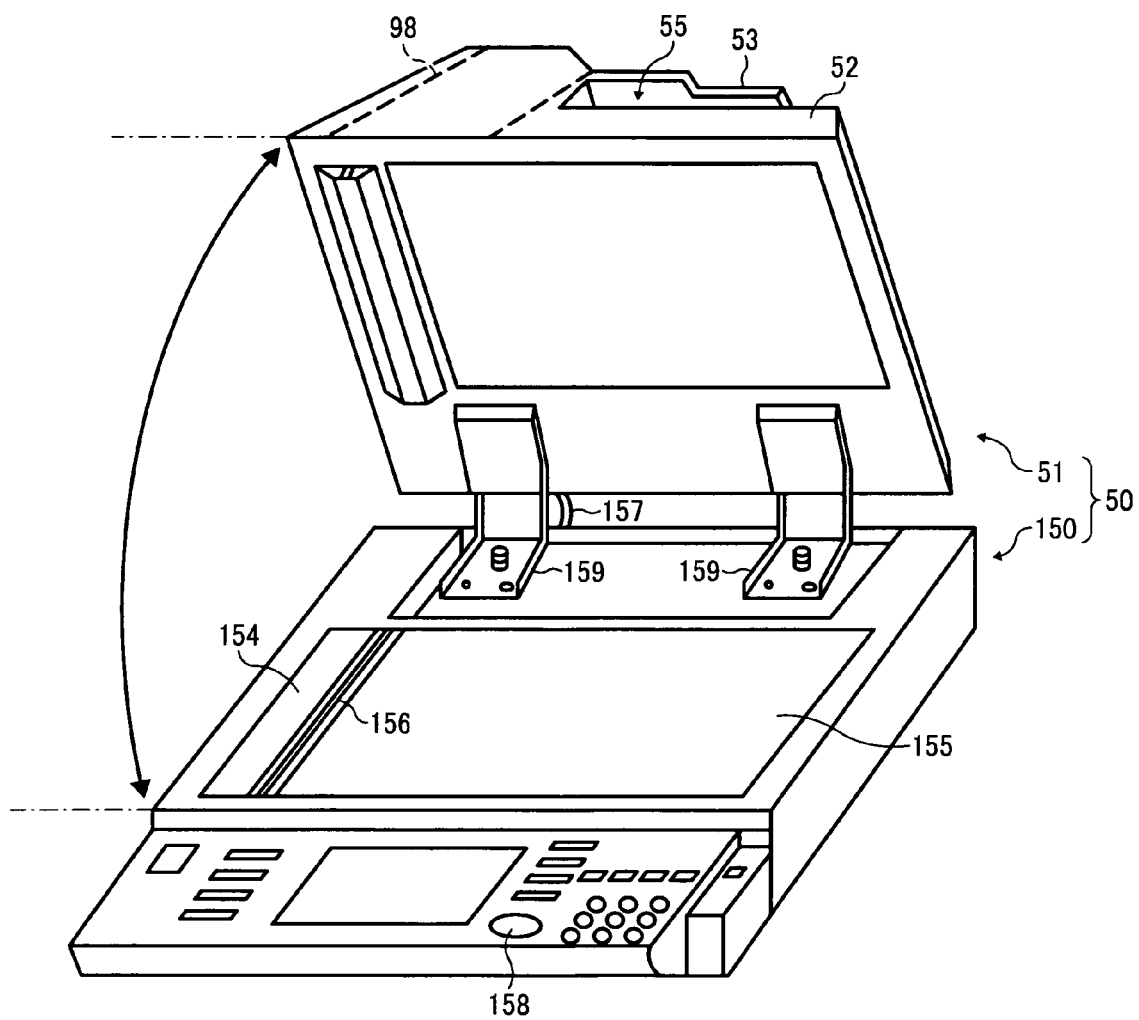
FIG. 4 illustrates an exemplary scanner and an ADF provided in the copier of FIG. 1.

The ADF 51 arranged on the scanner 150 includes a body cover 52 that supports an original document setting table 53 for setting an original document MS to read, a conveyance unit 98 for conveying the original document MS, and an original document stack table 55 for stacking the original documents MS after reading thereof and the like. As shown in FIG. 4, the ADF 51 is vertically moveably supported by the scanner 150 around a hinge 159 secured thereto. Thus, the ADF behaves like an open/close door and exposes the platen glass 154 and the contact glass 155 arranged on the scanner 150 when swinging and being open. When a one-side bound original document impossible to separate one by one is used, the ADF cannot convey the original documents. In such a situation, when the ADF 51 is open, the one-side bound original documents are placed onto the contact glass 155 with its page to be read directing downward as shown in FIG. 4. Then, the ADF is closed. After that, an image of the page is read by the moving reading section 152 of the scanner as shown in FIG. 1.

Whereas when a bundle of original documents MS simply stacking plural separated sheets is used, the ADF can automatically conveys the original documents one by one, so that the fixed first surface reading section 151 and the fixed second surface reading section 95 sequentially read the original documents. At that movement, a copy start button 158 is depressed after the original document bundle is placed on the original document setting table 53. Then, the ADF 51 conveys the original documents MS from the original document placing table 53 one by one while inverting the same toward the original document stack table 55 via the conveyance unit 98. In the course of conveyance, the original document MS is conveyed right above the fixed first surface reading section 151 of the scanner 150 right after being inverted. At this moment, an image of the first surface of the original document MS is read by the fixed first surface reading section 151 of the scanner 150.

Now, an exemplary principal section of the ADF and the upper section of the scanner 150 are described with reference to FIG. 5. An exemplary electric circuit of the ADF and the scanner 150 is also described with reference to FIG. 6. The ADF 51 includes an original document setting section A, a separation feeding section B, a registration section C, a turn section D, a first reading conveyance section E, a second reading conveyance section F, a sheet ejection section G, and a stack section H and the like.

Figure 6:
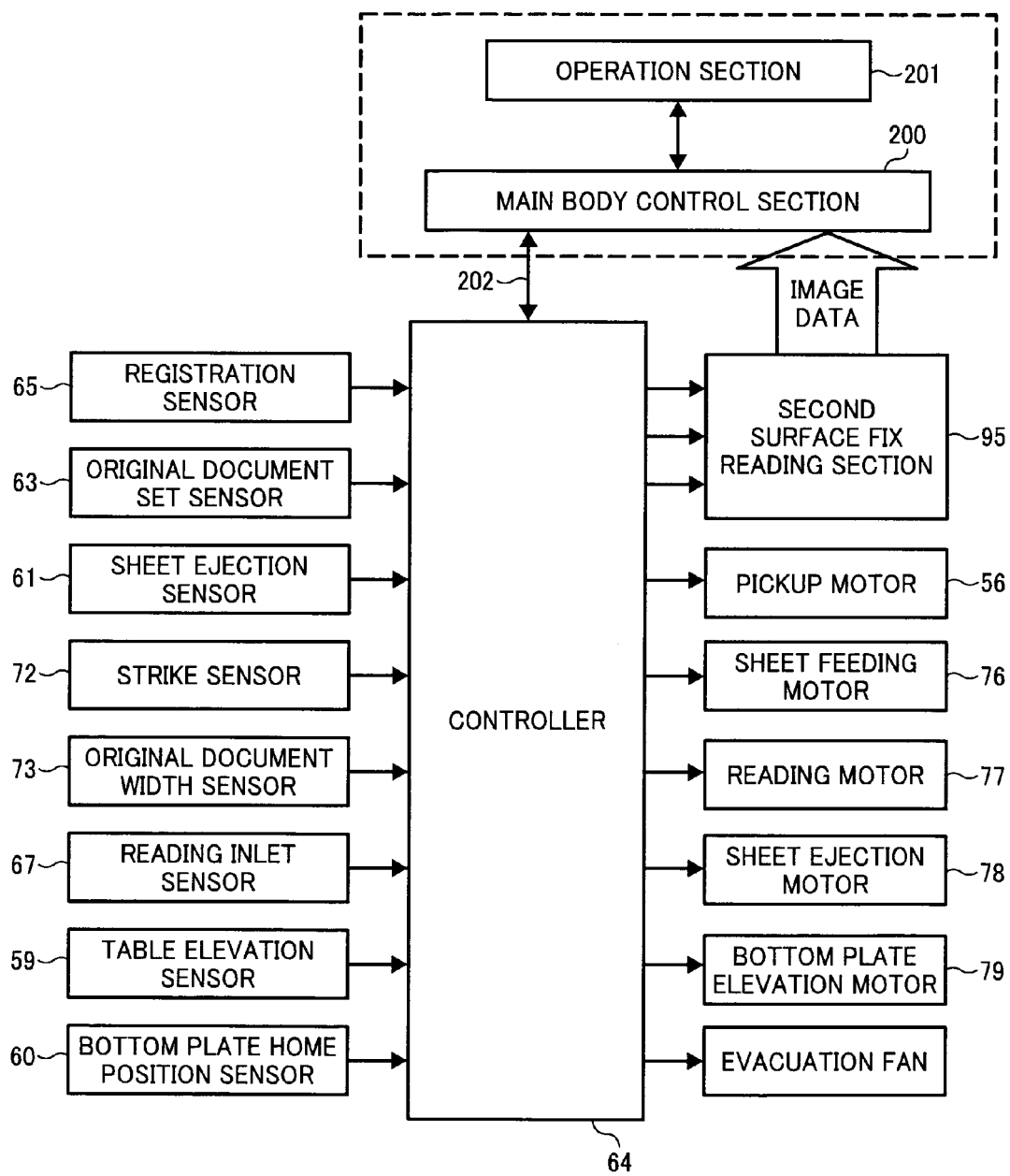
FIG. 6 partially illustrates an exemplary electric circuit controlling the copier of FIG. 1.

As shown in FIG. 6, the ADF 51 includes a controller 64 having such as an ASIC to generally control various instruments and sensors. The controller 64 is connected to a registration sensor 65, an original document setting sensor, an sheet ejection sensor, 61, a strike sensor 72, an original document sensor 73, a read inlet sensor 67, and a sheet feed appropriate position sensor 59. Also connected thereto are the fixed second surface reading section 95, a pickup motor 56, a sheet feed motor 76, a reading motor 77, a sheet ejection motor 78, a bottom plate elevation motor 79, and the like. Yet further connected is a main body control section 200 or the like that generally controls various instruments of the scanner 150. The scanner 150 includes such a main body control section 200 having a CPU and a RAM, not shown, or the like. Thus, various instruments and sensors, not shown, included in the scanner 150 can be controlled. The scanner 150 is connected to a controller 64 of the ADF 51 via an I/F 202, so that various instruments and sensors included in the ADF 51 can be controlled indirectly via the controller 64.

Figure 5:
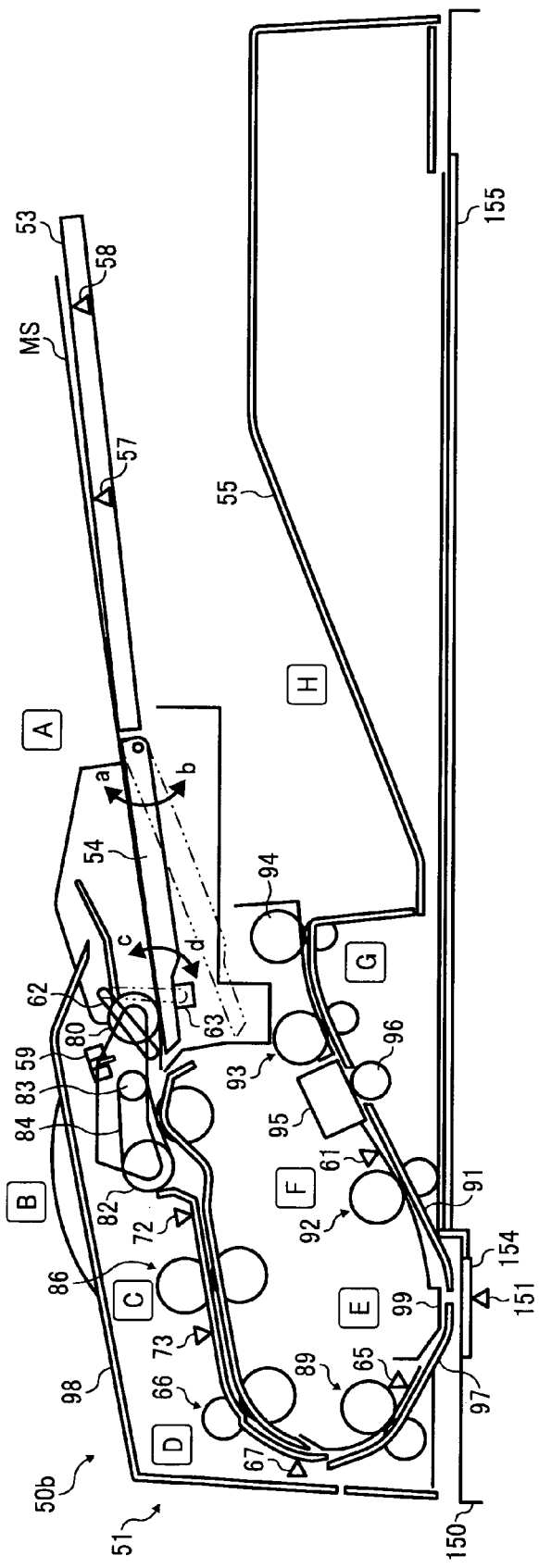
FIG. 5 illustrates a principal part of the ADF and the upper portion of the scanner.

As shown in FIG. 5, the original document setting section A includes an original document placing table 53 or the like for receiving the bundle of original documents MS to be set. The separation conveyance section B separates and conveys the bundle of original documents MS one by one. Further, the registration section C aligns and then further launches the original document MS that temporarily collides therewith; The turn section D includes a curvature conveyance section curving in a letter L shape and inverses the original document MS up side down while returning the same. The first reading conveyance section E conveys the original document above the platen glass 154 while letting the fixed first surface reading section 151 arranged inside the scanner, not shown, to read the first side of the original document below the platen glass 154. The second reading conveyance section F conveys the original document below the fixed second surface reading section 95 while letting the fixed second surface reading section 95 to read the second side of the original document. Further, the sheet ejection section G ejects the original document having been subjected to image reading for both sides thereof toward a stack section H. Further, the stack section H stacks the original documents on the original document stack table 55.

The tips of the original documents are placed on the movable original document table 54 movable in directions "a" and "b" in accordance with thickness of the original document, and the original documents are set with their trailing end sides being placed on the original document placing table 53. At this moment, on the original document placing table 53, side guides, not shown, collude with both ends of the original documents in the widthwise direction, so that a position of the original documents is aligned. The original documents set in this way pushes up a lever member 62 freely swingably arranged above the movable original document 54. Then, the original document setting sensor 63 recognizes setting of the original documents and transmits a detection signal to the controller 64. Then, the detection signal is transmitted to the main body control section 200 via the I/F 202 from the controller 64.

On the original document placing table 53, first and second original document length detection sensors 57 and 58 each including a reflection type photo-sensor or a actuator type sensor are mounted to detect the length of the original documents in a conveyance direction.

Above the bundle of the original documents placed on the movable original document 54, a pickup roller 80 is movably supported in an up and down direction (i.e., "c" and "d" directions) by means of a cam mechanism. The cam mechanism can lift the pickup roller 80 by driving a pickup motor 56. Specifically, when the pickup roller 80 rises, the movable original document 54 swings in the direction as shown by an arrow "a", and thus contacts the uppermost original document in the bundle. When the movable original document 54 further rises, the sheet feeding correct position sensor 59 detects arrival at the upper limit of the movable original document 54 before long. Thus, the pickup motor 56 stops driving and the movable original document 54 stop rising.

A key operation0 of setting one of both side and one side reading modes, as well as a depression operation of depressing a copy start key 158, and the like are executed through a main body operation section 201 of a copier that includes ten key pads or a display and the like. When the copy start key 158 is depressed, an original document feeding signal is transmitted to the controller 64 of the ADF 51 via the I/F 202 from the main body control section 200. Then, the pickup roller 80 rotates and drives as the sheet feed motor 76 rotates in a normal direction, and launches the original documents on the movable original document 54.

The above-mentioned setting of one of both side and one side reading modes can be executed at once for all of the original documents placed on the movable original document 54. Further, both modes can be optionally set, such that the both side reading mode can only be set for first and tenth original documents, for example, while the one side reading mode can be set for the remaining original documents.

The original document launched by the pickup roller 80 enters a separation conveyance section B, and is brought into a contact position contacting a sheet feeding belt 84. The sheet feeding belt 84 is suspended by drive and driven rollers 82 and 83, and is endlessly moved clockwise as the drive roller 82 rotates when a sheet feeding motor 76 normally rotates. A reverse roller 85 contacts the lower suspension surface of the sheet feeding belt 84, which is driven rotated clockwise as the sheet feeding motor 76 normally rotates. At the contact section, the surface of the sheet feeding belt 84 moves in a sheet feeding direction. Whereas the reverse roller 85 contacts the sheet feeding belt 84 with a prescribed pressure, and is driven by a belt or an original document when contacting the sheet feeding belt 84 directly or via a sheet of the original document at the contact section. However, when plural original documents are pinched at the contact section, a driven force thereof decreases than a torque of a torque limiter. Thus, the reverse roller 85 driven rotates clockwise opposing to the driven rotated direction. Thus, the original documents lower than the upper most are given a moving force in the opposite direction to sheet feeding by the reverse roller 85, thereby only the upper most original document is separated from the plurality of those.

The original document separated into one by the function of the reverse roller 85 and the sheet feeding belt 84 enters the registration section C. Then, the tip of the original document is detected when passing through a right lower section of the strike sensor 72. At this moment, the pickup roller 80 yet receives a driving force of the pickup motor 56 and is rotating. However, since the movable original document table 54 descends and separates from the original document, the original document is conveyed only by an endless moving force of the sheet feeding belt 84. Then, the sheet feeding belt 84 continues endless movement for a prescribed time period after when the strike sensor 72 detects the tip of the original document, so that the tip of the original document bumps into a contact section where a pullout drive roller 86 and a pullout driven roller 87 driven rotated by the pullout drive roller 86 while contacting the same. Since a trailing end of the original document is fed while the tip thereof striking the contact section of the rollers, the original document is bent with a prescribed amount. Thus, a skew (i.e., inclination) of the original document is corrected so that the original document takes a posture along the sheet feeding direction.

Beside correcting the skew of the original document, the pull out driven roller 87 has a function to convey the original document until an intermediate roller pair 66 arranged down stream after skew correction, and is thus driven rotated as the sheet feeding motor 76 reversely rotates. When the sheet feeding motor 76 reversely rotates, the pull out driven roller 87 and one of the intermediate roller pair 66 start rotating while the sheet feeding belt 84 stops endless movement. At this moment, the pickup roller 80 also stops rotating.

The original document launched from the pull out driven roller 87 passes through a section right below the original document width sensor 73. The original document width sensor 73 includes plural sheet detection sections each having a reflection type photo sensor or the like and are arranged in the original document widthwise direction. In accordance with a position of the sheet detection section, a width of the original document is detected. Further, a length of the conveyance direction of the original document is recognized in accordance with a time elapsing from when the strike sensor 72 detects the tip of the original document to when it does not detect the trailing end thereof.

The tip of the original document enters a turn section D and is sandwiched between the intermediate roller pair 66. A conveyance speed of the original document conveyed by the intermediate roller pair 66 is higher than that in the first reading conveyance section E. Thus, a time until the original document is launched up to the first reading conveyance section E is reduced.

The tip of the original document conveyed in the turn section D passes through a section opposing to the read inlet sensor 67. When the read inlet sensor 67 detects the tip of the original document, the original document conveyance speed controlled by the intermediate roller pair 66 decreases before the tip thereof arrives at the read inlet roller pair 89 arranged downstream. As the reading motor 77 starts rotating, each one of the read inlet roller pair 89, the read outlet roller pair 92, and the second read outlet roller pair 93 starts rotating.

Within the turn section D, the original document is turned upside down and returned by the curvature conveyance path arranged between the intermediate roller pair 66 and the read inlet roller pair 89. The tip of the original document having passed through the section right below the registration sensor 65 passes through the nip between the read inlet roller pair 89. When the registration sensor 65 detects the tip of the original document, the original document conveyance speed decreases within a prescribed conveyance length and ultimately temporarily stops at a position short of the first reading conveyance section E. Further, a registration stop signal is transmitted to a main body control section 200 via the I/F 202.

When the main body control section 200 receives the registration signal and transmits a read start signal, the controller 64 controls the read motor 77 to resume rotation and increases the conveyance speed of the original document to a prescribed level before the tip thereof arrives and enters the first reading conveyance section E. Then, the controller 64 transmits a gate signal representing a valid image region in a sub scanning direction on the first surface of the original document to the main body control section 200 at a time calculated as the tip of the original document arrives at a read position for the fixed first surface reading section 151. Such transmission continues until the trailing end of the original document passes through the reading position of the fixed first surface reading section 151, so that the first surface is read by the fixed first surface reading section 151.

The original document having passed through the first reading conveyance section E passes through the read outlet roller pair 92, and is detected by the sheet ejection sensor 61. When the one side read mode is set, reading of the second surface of the original document by the fixed second surface reading section 95 mentioned later is not needed. When the sensor 61 detects the tip of the original document, the sheet ejection motor 78 starts normal driving and a lower side sheet ejection roller of the sheet ejection roller pair 94 is driven rotated clockwise. Further, based on a sheet ejection motor pulse count started from when the tip of the original document is detected by the sensor 61, a time when the trailing end of the original document passes through the nip of the sheet ejection roller pair 94 is calculated. Then, the driving speed of the sheet ejection motor 78 is decreased to eject the original document so that the original document does not jump out of the original document placing table 55 just before a time calculated as when the trailing end of the original document passes through the nip of the sheet ejection roller pair 94.

When a duplex read mode is designated, a time from when the sheet ejection sensor 61 detects the tip of the original document to when it arrives at the fixed second surface reading section 95 is calculated based on an amount of pulses generated by the read motor 77. At that time, a gate signal representing a valid image region in the sub scanning direction on the second surface of the original document is transmitted to the main body control section 200 from the controller 64. Such transmission is continued until the trailing end of the original document passes through the reading position of the fixed second surface reading section 95, and thus, the fixed second surface reading section 95 reads the second surface.

The fixed second surface reading section 95 includes a contact type image sensor subjected to a coating process on its read surface to prevent a read line that is caused by attraction of paste state alien substance onto the original document. A second read roller 96 is arranged at a position opposing the second fixed reading section 95 as an original document supporting device to support the original document from the none read surface side (i.e. a first surface side). The second reading roller 96 prevents the original document from floating at the read position of the fixed second surface reading section 95 while serving as a ref white section to provide shading data at the fixed second surface reading section 95. Instead of the second read roller 96 employed in this embodiment as the original document supporting device at the opposing position to the fixed second surface reading section 95, a guide plate type can be used.

Figure 7:
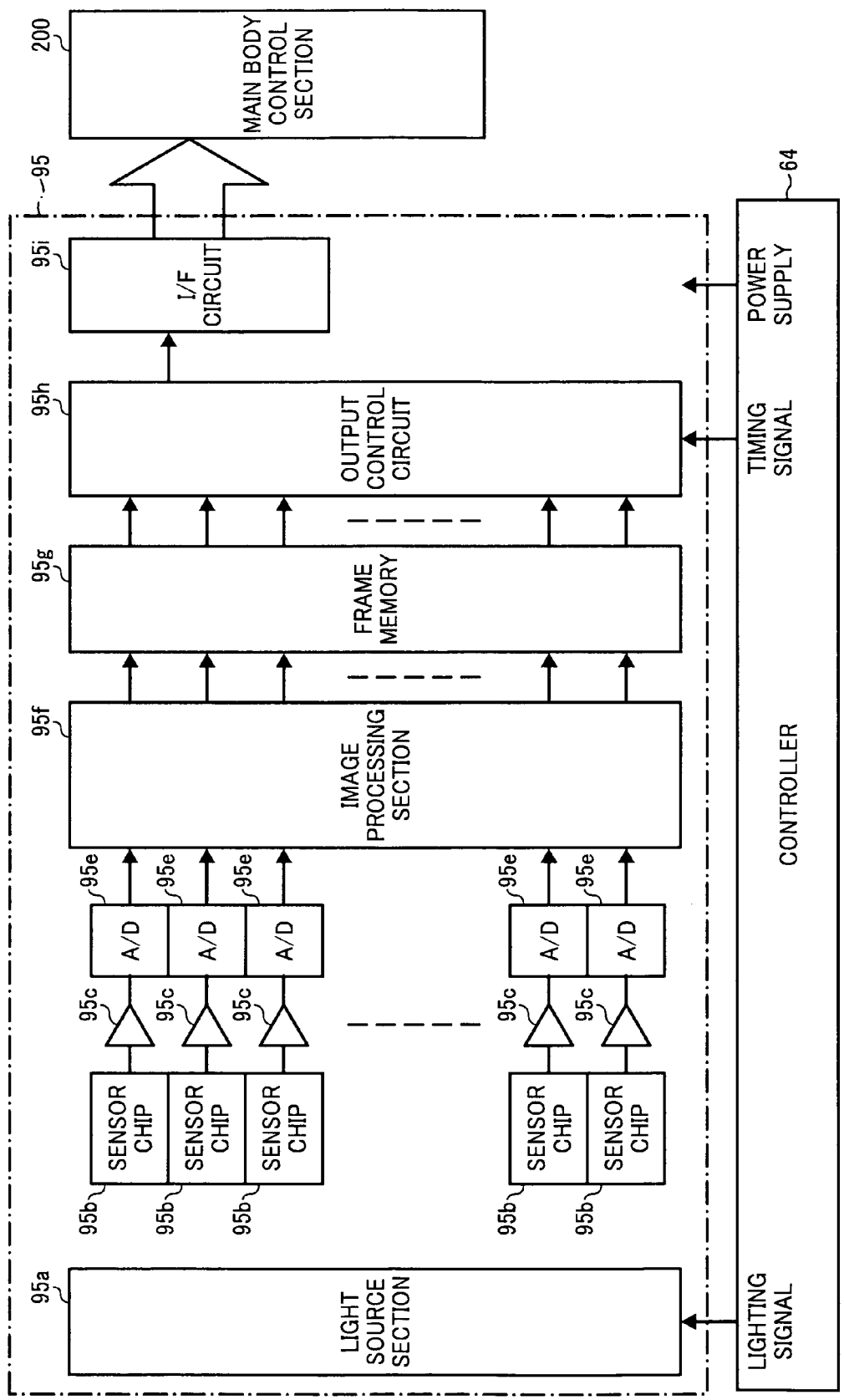
FIG. 7 illustrates a principal part of an exemplary electric circuit that controls a fixed reading section for the second surface.

Now, an exemplary electric circuit of the fixed second surface reading section 95 is described with reference to FIG. 7. As shown, the fixed second surface reading section 95 includes a light source section 95a, such as a LED array, a fluorescent, a cold-cathode tube, etc. Also included are plural sensor chips 95b aligning in the main scanning direction, plural OP amplifier circuits 95c respectively connected to the plural sensor chips 95b, and plural A/D converters 95e respectively connected to the plural OP amplifier circuits 95c. Yet further included are an image processing section 95f, a frame memory 95g, an output control circuit 95h, and an I/F circuit 95i, and the like.

The sensor chip 95b includes a photoelectric transducer called a same magnification image sensor and a collimate lens. Prior to entrance of an original document, not shown, into the reading position for the fixed second surface reading section 95, the controller 64 transmits a turning on signal to the light sources 95a. Thus, the light sources 95a turns on and emits a light to a second surface of the original document, not shown. The reflected light by the second surface of the original document is collimated at the photoelectric transducer by the collimate lens and are read by the plural sensor chips 95b as image information. The image information read by these sensor chips 95b are amplified by an OP amp circuit 95c, and are then converted by the A/D converter 95e into digital image information. The digital image information is inputted to the image processing section 95f and subjected to shading processing. The digital image information is then temporarily stored in the frame memory 95g. The image information is then converted into a data form acceptable to the main body control section 200 by the output control circuit 95h, and is outputted via the I/F circuit 95i.

The controller 64 outputs a time signal representing a time when the tip of the of arrives at a reading position for the fixed second surface reading section 95 (so that image data after the time is regarded as valid data). Also outputted are a lightening signal for a light source, power source, or the like.

Figure 8:
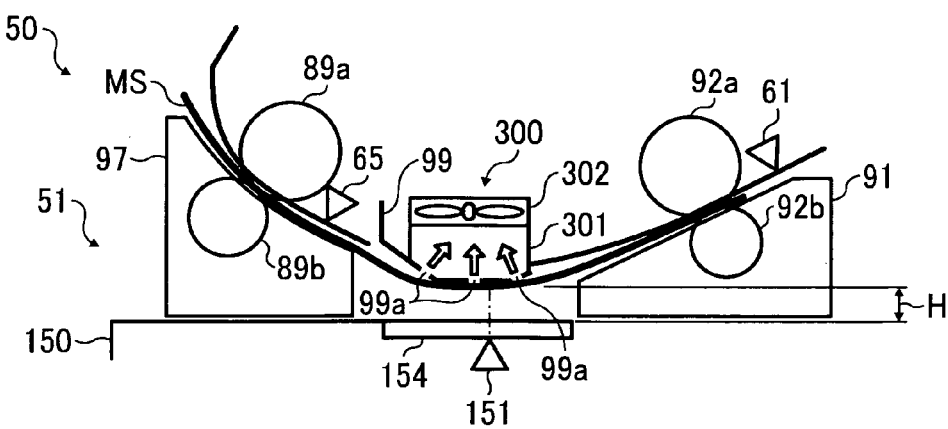
FIG. 8 illustrates exemplary surroundings of the fixed reading section for the first surface.

Now, an exemplary feature of the copier is described with reference to FIG. 8 that illustrates a fixed type first surface reading section 151 and surroundings.

As shown, an opposing guide member 99 is arranged separated from the platen glass 154 by a prescribed distance H, and includes plural suction holes 99a. A suction device 300 is provided on the backside of the opposing guide member 99. The suction device 300 includes a suction duct 301 and a suction fan 302. The suction duct 301 includes a concave space opening downward. The size of the opening is as large as a region in which the suction holes 99a are formed. The opening end of the suction duct 301 contacts the backside surface (i.e., the upper surface) of the opposing guide member 99. Plural suction holes are provided on the bottom surface of the concave space (i.e., the upper surface of the suction duct 301). A suction fan 302 is attached to the suction holes. Thus, when the suction fan 301 is driven, air is sucked through the suction holes 99a.

The original document conveyed to the opposing guide member 99 by the read inlet roller pair 89 (89a, 89b) is absorbed to the opposing guide member 99 by the suction force of the suction fan 301 and passes through the original document read position. As a result, the original document is conveyed keeping a distance H from the platen glass 154. Since the original document is conveyed with a distance H from the platen glass 154 at the read position in this way, the original document does not slide contact the platen glass 154. Thus, the dust or the like sticking to the original document does not attract to the read position of the platen glass 154 due to contact sliding with the platen glass 154.

Figure 9:
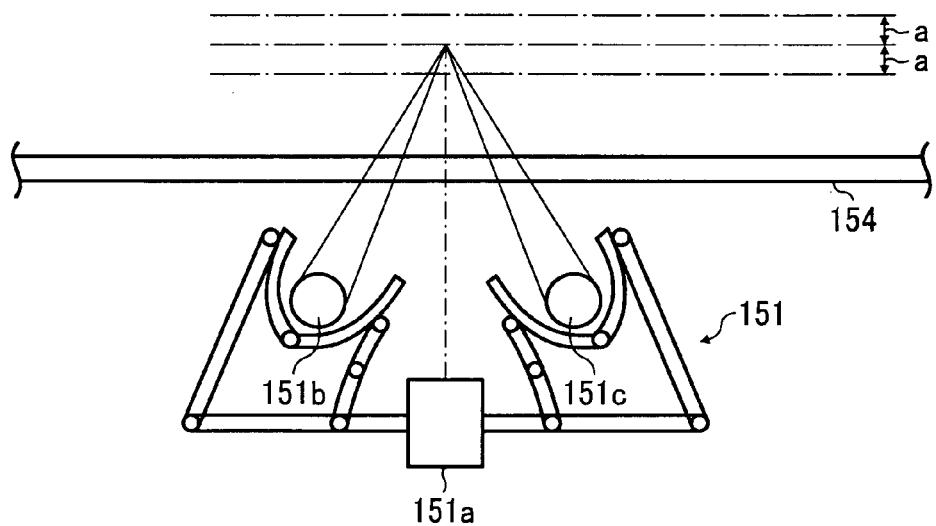
FIG. 9 schematically illustrates an exemplary configuration of the fixed reading section for the first surface.

Now, an exemplary fixed type first surface reading section 151 is described with reference to FIG. 9. As shown, a pair of light sources 151b and 151c is provided. An image read sensor 151a is arranged below and between the pair of light sources 151b and 151c. The image read sensor 151a can employ a CCD and a CIS (contact image sensor) or the like. To maximize the light intensity on an image formation surface of the original document, emission angles of respective light sources 151b and 151c are adjusted. Further, a focal point of the image reading sensor 151a is placed on an original document conveyance path. The platen glass 154 is deviated from a depth of focus on an optical axis, in which an image is finely focused around a center of a focal point of the image reading sensor 151a. Thus, if a dust attracts to the reading position of the platen glass 154, since the dust on the platen glass is not focused, it blurs when read by the image reading sensor 151a. As a result, the dust only causes a thin line in shade on a read image. Depending on a read condition, such as when density of a read image is designated less than that of an original document image, the line can be prevented from appearing.

Instead of such a suction device 300, an electrostatic force can be employed to absorb the original document onto the opposing guide member 99 by providing a voltage thereto.

Figure 10:
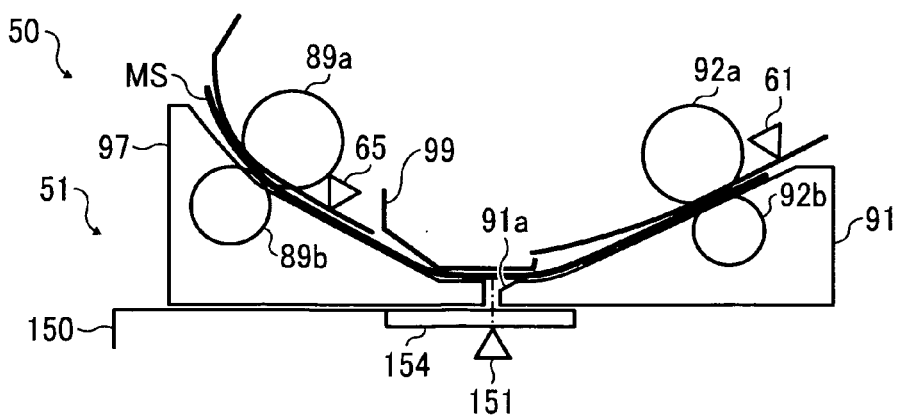
FIG. 10 illustrates another exemplary surroundings of the fixed reading section for the first surface.

Now, a first modification is described with reference to FIG. 10 illustrating an exemplary image reading device 50a having a fixed type first surface reading section 151 and surroundings.

As shown, the image reading device 50a includes a upstream side guide member 97 arranged upstream of the read position in the vicinity thereof, and a downstream side guide member 91 arranged downstream of the read position in the vicinity thereof. These guide members 91 and 97 are arranged adjacent to each other and collectively convey the original document apart from the platen glass 154 by a distance H at the reading position. A downward inclination surface 91a directing downward is arranged at the upstream end of the downstream side guide member 91 to pick up the tip of the original document. Thus, even if the tip of the original document is curled, the tip can strike the inclined surface 91a and is smoothly guided toward the downstream side guide member 91.

The driven roller 89b of the reading inlet roller pair 89 is freely swingably mounted on the upstream side guide member 97. The driven roller 92b of the reading outlet roller pair 92 is also freely swingably mounted on the downstream side guide member 91.

A gap is formed between the up and down stream side guide members 91 and 97 and includes a slit that enables a light emitted from the fixed type first surface reading section 151 and reflected by the image surface of the original document to pass and advance to the image read sensor 151a. Thus, a dust or the like attracting to the original document is surpassed to drop on the read position of the platen glass as minimum as possible. Thus, the gap is not limited to the slit shape as above and the other gaps can be employed if they are capable of conveying the original document apart from the platen glass 154 by a distance H. Specifically, all the system has, to meet is that the original document conveyance path is arranged within a depth of focus of the image reading sensor 151a at the reading position.

Figure 11:
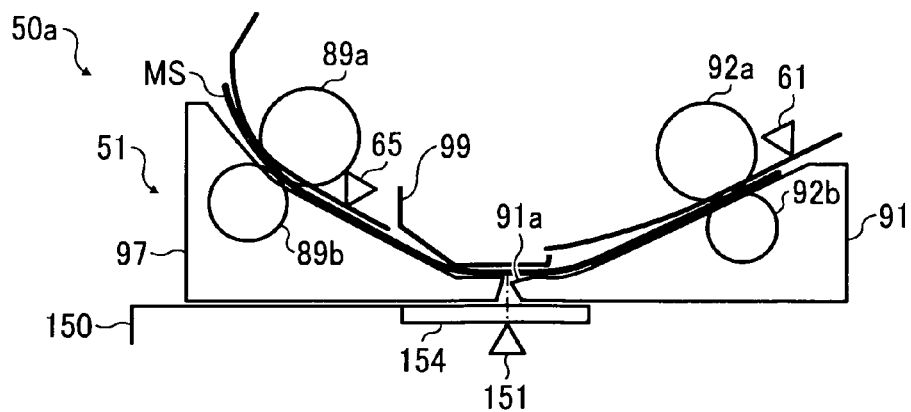
FIG. 11 illustrates an exemplary image reading device that includes up and downstream side guide members arranged via a slit state gap having a tapered portion extending toward the platen glass.

Further, as shown in FIG. 11, the slit state gap can be a taper state extending toward the platen glass 154. As also shown in FIG. 9, the light sources 151b and 151c emit lights toward the image reading sensor 151a. Thus, with the shape of FIG. 11, the gap on the original document conveyance path side is decreased without intercepting the light path extending from the light sources 151b and 151c. Thus, a dust or the like attracting to the original document is more efficiently surpassed to drop on the read position of the platen glass 154.

Figure 12:
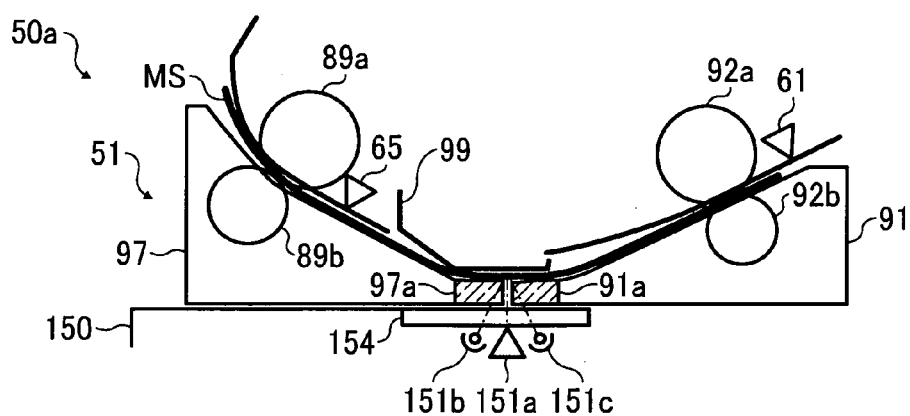
FIG. 12 illustrates another exemplary image reading device that includes up and downstream side guide members each partially having a transparent portion around a reading position.

Further, the up and downstream side guide members 91 and 97 can be transparent either in whole or in part inn the vicinity of the reading position as shown in FIG. 12. Thus, with the shape of FIG. 11, a gap on the original document conveyance path side is decreased without intercepting the light paths of the light sources 151b and 151c. In such a situation, the up and downstream side guide members 91 and 97 do not intercept the light path of the light sources 151b and 151c even arranged thereon. Thus, the gap on the original document conveyance path side can be narrowed, and thus, a dust and a paper dust or the like are more efficiently surpassed to drop on the read position of the platen glass 154. Further, by partially making the up and downstream side guide members 91 and 97 transparent in the vicinity of the reading position, black color correction can be efficiently executed for the image reading sensor 151a while avoiding influence of an external light in comparison with those entirely made into transparent.

Figure 13:
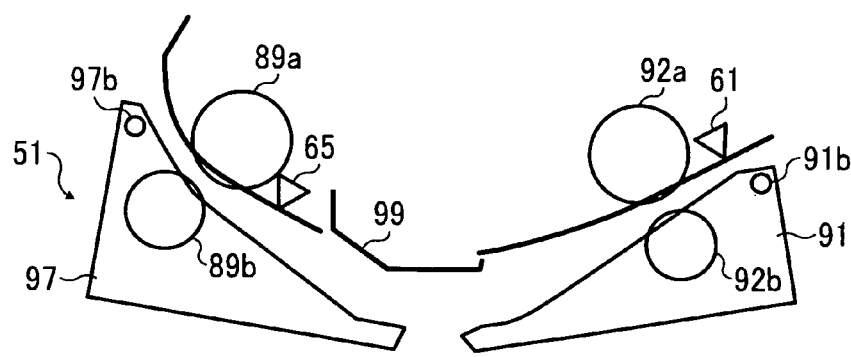
FIG. 13 illustrates another exemplary image reading device that includes up and downstream side guide members each freely swingably mounted to a body cover of the ADF.

Further, as a result of approximating the up and downstream side guide members 91 and 97 to each other, a jam sheet (i.e. original document) is hardly removed when occurring in the vicinity of the reading position. Then, as shown in FIG. 13, the up and downstream side guide members 97 and 91 can be freely swingably attached to a main body cover 52 of the ADF 51. Specifically, as shown, supporting protrusions 97b are arranged at main scanning both side ends of the upstream side guide member 97 in the vicinity of the upstream side end thereof. These supporting protrusions are loosely fit into supporting holes, not shown, formed on front and rear side plates, not shown, of the main body cover 97b, respectively. Similarly, supporting protrusions 91b are arranged at main scanning both side ends of the downstream side guide member 91 in the vicinity of the downstream side end thereof. These supporting protrusions 91b are loosely fit into supporting holes, not shown, formed on front and rear side plates, not shown, of the main body cover 52, respectively. Thus, when the ADF 51 is open, the upstream side guide member 97 automatically rotates by its own weight around the supporting protrusion 97b as a fulcrum, and the conveyance path arranged upstream of the reading position is exposed. Simultaneously, the downstream side guide member 91 automatically swing by its own weight around the supporting protrusion 91b as a fulcrum, and the conveyance path arranged downstream of the reading position is similarly exposed. Thus, the jam sheet (i.e. original document) is readily removed even occurring in the vicinity of the reading position. Further, since the up and downstream side guide members 97 and 91 automatically swing, the jam sheet (i.e. original document) removal is more readily executed than when it is manually removed.

When the ADF 51 is closed, the up and downstream side guide members 97 and 91 contact and are depressed by the upper surface of the scanner 150. Thus, they swing and return to their original positions for guiding the original document.

Figure 14:
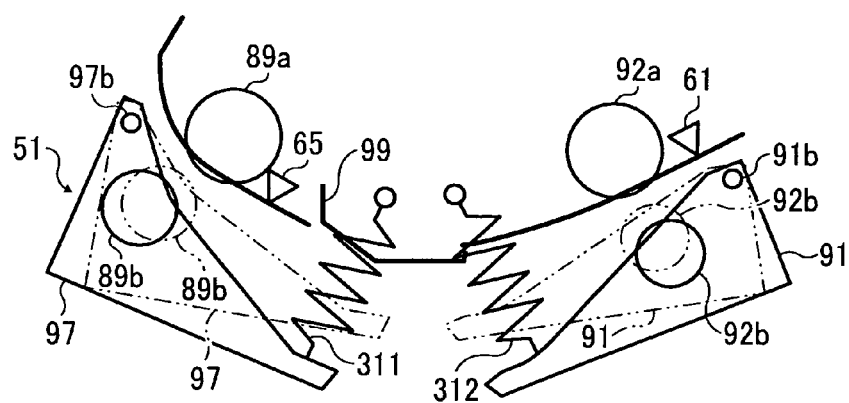
FIG. 14 illustrates an exemplary modification of the image reading device that includes springs for inhibiting the swinging of the respective up and downstream side guide members.

When a range of swinging caused by their own weights is wide, the up and downstream side guide members 97 and 91 don't swing to their original positions being linked with closing movement of the ADF 51 even when the ADF is closed sometime. Then, as shown in FIG. 14, springs 311 and 312 can be arranged as restriction devices to restrict rotation of the up and downstream side guide members 97 and 91, respectively. One end of the spring 311 is attached to the downstream side end of the upstream side guide member 97 and the other end is attached to the main body cover 52. One end of the spring 312 is similarly attached to the upstream side end of the down streamside guide member 91 and the other end is attached to the main body cover 52.

When the ADF 51 is closed and thus the up and downstream side guide members 97 and 91 are supported by the scanner 50, the springs 311 and 312 are in the sate of no tension length. When the ADF 51 is open, the up and downstream side guide members 97 and 91 swing to positions where their own weights are commensurate with tensions of the springs 311 and 312, respectively. To remove the original document jamming in the vicinity of the reading position, one of the up and downstream side guide members 97 and 91 is picked up and swung to a position illustrated by a rigid line to expose the original document conveyance path. Thus, the original document jamming in the vicinity of the reading position can be readily removed. When one of the up and downstream side guide members 97 and 91 is released after that, one of the up and downstream side guide members 97 and 91 returns to a position as illustrated by a dotted line. When the ADF 51 is to be closed, since the up and downstream side guide members 97 and 91 do not widely swing, these guide members 91 and 97 are depressed by the upper surface of the scanner 150 and return to the position for guiding the original document.

Figure 15:
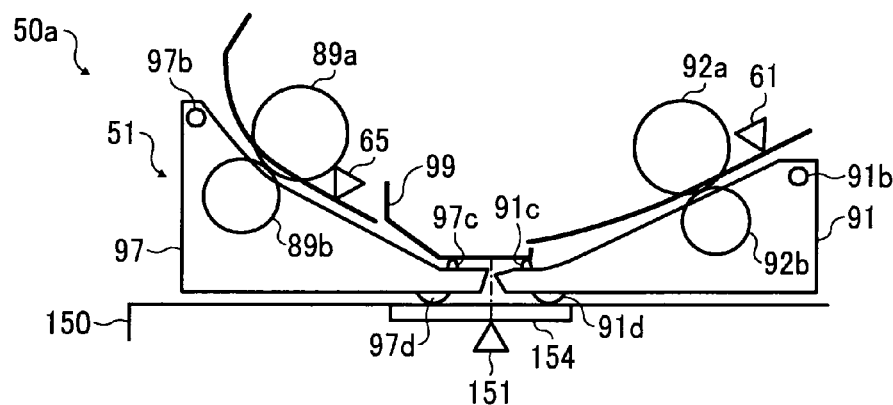
FIG. 15 illustrates another exemplary modification of the image reading device that includes positioning protrusions mounted on the up and downstream side guide members.

However, unless a finishing precision of the lower surface of the belt guide members 91 and 97 and the upper surface of the scanner 50 is improved, the positioning of the respective guide members 91 and 97 cannot be precisely achieved when they contact each other. Specifically, when the positioning precision is poor, the original document conveyance path can be deformed and goes beyond the depth of focus of the image reading sensor 151a. Otherwise, the original document likely causes jamming due to excessively narrow original document conveyance path. Then, as shown in FIG. 15, positioning protrusions 91(c, d) and 97(c, d) can be provided on the respective guiding members 91 and 97. Specifically, as shown, a first positioning protrusion member 97c is arranged on the upper surface of the downstream side end of the upstream side guide member 97, while a second positioning protrusion member 97d is arranged on the lower surface of the upstream side guide member 97 in the vicinity of the downstream side end thereof. Similarly, a first positioning protrusion member 91c is arranged on the upper surface of the upstream side end of the down stream side guide member 91, while a second positioning protrusion member 91d is arranged on the lower surface of the down stream side guide member 97 in the vicinity of the upstream side end thereof. Thus, when the ADF 51 is closed, the first and second positioning protrusion members 91c and 97c contact the opposing guide members 99, respectively. Thus, the gap to the opposing member 99 is avoided to be too narrow, and accordingly the original document can smoothly be conveyed without causing jam. Further, due to that the second positioning protrusions 91d and 97c contact the upper surface of the scanner, the gap to the opposing member 99 does not become too broad, and the original document conveyance path is not deviated from a depth of focus of the image reading sensor 151a.

Figure 16:
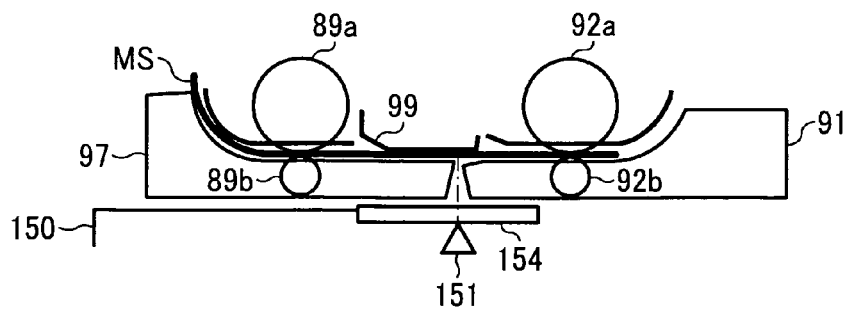
FIG. 16 illustrates another exemplary image reading device having a conveyance path extending in parallel to the platen glass from a reading inlet roller pair to a reading outlet roller pair.

Further, as shown in FIG. 16, a conveyance path starting from the reading inlet roller pair 89 to the reading outlet roller pair 92 is preferably in parallel to the surface of the platen glass 154. Thus, the original document can be fed substantially straight via the reading position, and accordingly, a high quality image can be obtained.

Figure 17:
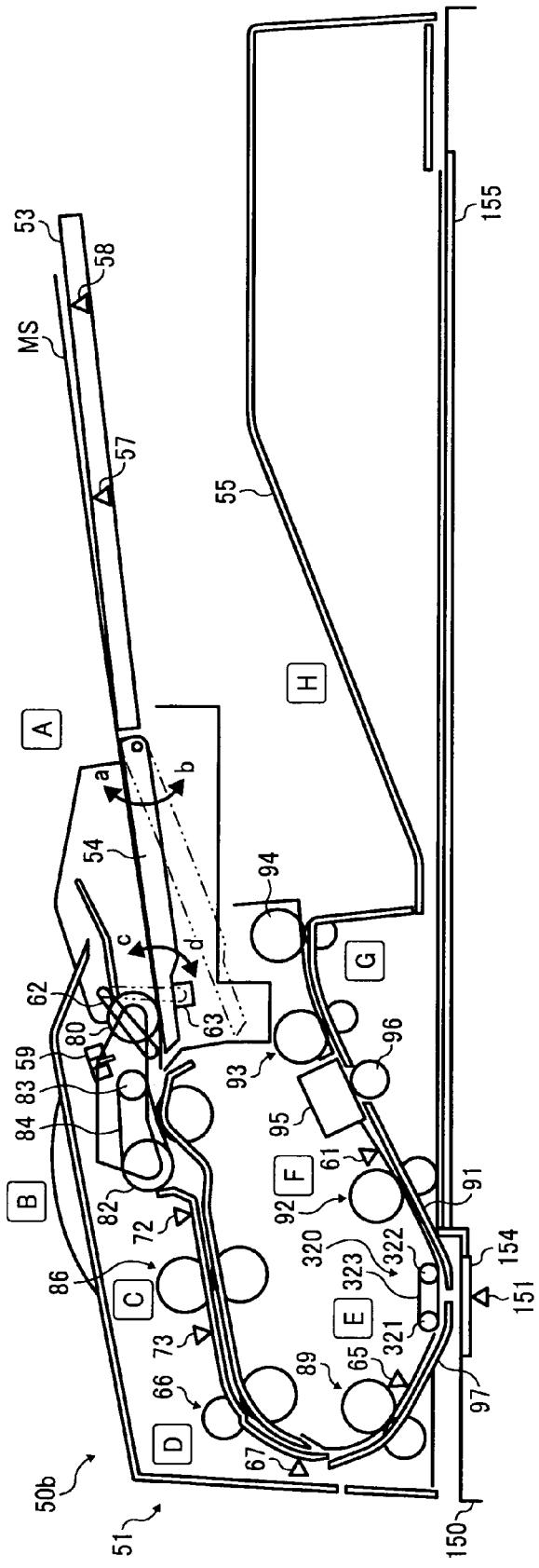
FIG. 17 illustrates a principal part of another exemplary modification of the ADF and the upper portion of the scanner.

Now, a second exemplary modification is described with reference to FIGS. 17 and 18. As shown, an image reading device 50b of the second modification includes a belt guide mechanism 320 serving as an opposing guide arranged opposing and apart from the platen glass by a distance H. The belt guide mechanism 320 includes a guide belt 323 suspended by drive and driven rollers 3.22 and 321. Further arranged is a charge device serving as an absorption device that has a charge roller 324 that contacts the outer circumferential surface of the guide belt 323 and a power supply 325 that supplies a voltage to the charge roller 323. The guide belt 323 travels counter clockwise being driven by the drive roller 322. The charge roller 324 is arranged outside an original document absorption region of the guide belt 323.

The original document conveyed to the guide belt 323 by the reading inlet roller pair 89 causes dielectric polarization due to an electric field created by the guide belt 323. Thus, an electric charge having a polarity opposite to that on the guide belt 323 is generated by the dielectric polarization on the guide belt side of the original document, so that the original document is electrostatically absorbed onto the guide belt 323. The original document absorbed to the guide belt 323 passes through the reading position as the guide belt 323 travels, and is conveyed apart from the platen glass 154 by a distance H as a result. The original document conveyed to the suspension section of the drive roller 322 passing through the reading position separates from the guide belt 323 due to curvature and moves toward the downstream side guide member 91. Thus, also in the second modification, the original document can be conveyed with the distance H from the platen glass 154 at the reading position. Since the original document does not sliding contacts the platen glass 154, the dust or the like attracting to the original document does not attract to the reading position of the platen glass 154 even the contact sliding occurs.

Instead of the electrostatic absorption, air suction force can be used to absorb the original document on conveyance onto the guide belt 323. In such a situation, plural suction holes are formed on the guide belt 323, and a suction device as shown in FIG. 8 is provided to suction air via the suction holes in a region opposing the platen glass 154.

Figure 19:
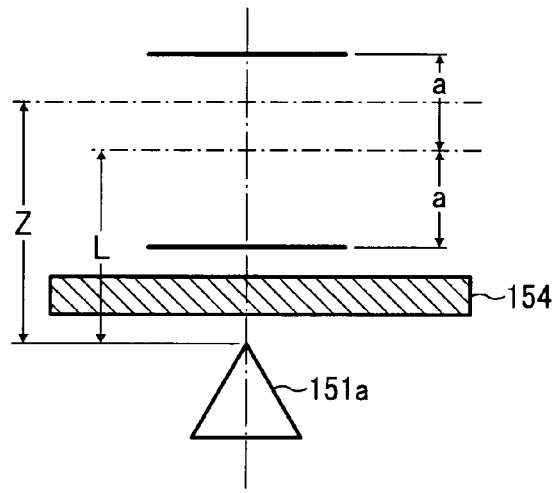
FIG. 19 schematically illustrates an exemplary positional relation between an image reading sensor and an image of the original document in the image reading device according to the other modification.

In such a situation, as shown in FIG. 19, a distance Z from the image reading sensor 151a to the original document needs to be calculated by the below described formula, wherein L represents a distance from the image reading sensor 151a to a focal point of the image reading sensor 151a, and ±a represents a depth of focus of the image reading sensor 151a;

$$L-a \leq Z \leq L+a$$

When the guide belt 323 attracts and conveys the original document and the original document either rises at the reading position from the guide belt 323 or is folded, and thus a distance Z deviates from the value L±a or the like, an image is not focused and blurs.

Figure 20:
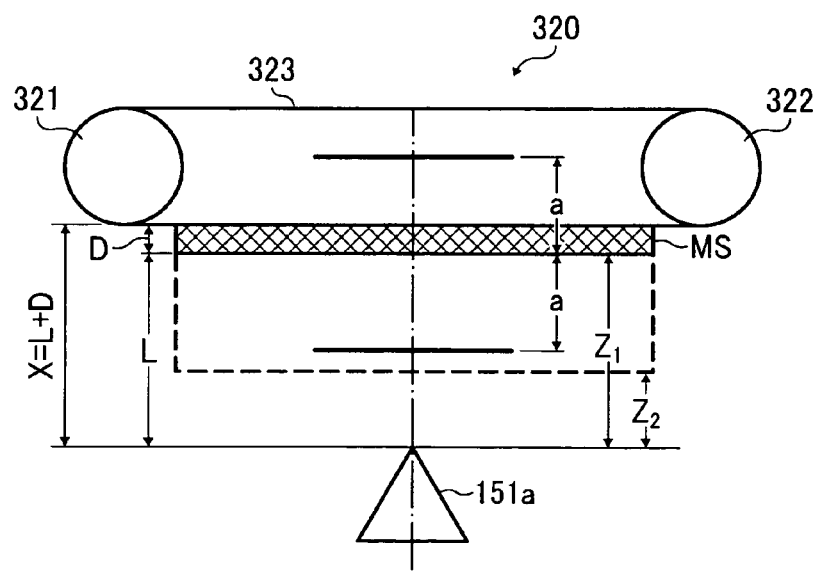
FIG. 20 schematically illustrates an exemplary positional relation between a focusing point and a guide belt provided in the image reading device according to the other modification.

As shown in FIG. 20, a focal point of an image reading sensor 151a is preferably placed on the original document conveyance surface. Thus, a distance X from the image reading sensor 151a to the surface of the guide belt 323 should meet the following formula, wherein a thickness of the original document is represented by D;

$$X=L+D$$

However, when the depth of focus "a" of the image reading sensor 151a is extraordinarily small and a thick paper is used, the distance Z2 from the position of the original document image to the image reading sensor 151a is smaller than the value L−a. Thus, the original document image is not focused sometimes as shown by a dotted line. As a result, a read image likely blurs.

Then, the thickness of the original document on conveyance is detected and the belt guide mechanism 320 may be moved up and down based on the detection result.

Figure 21:
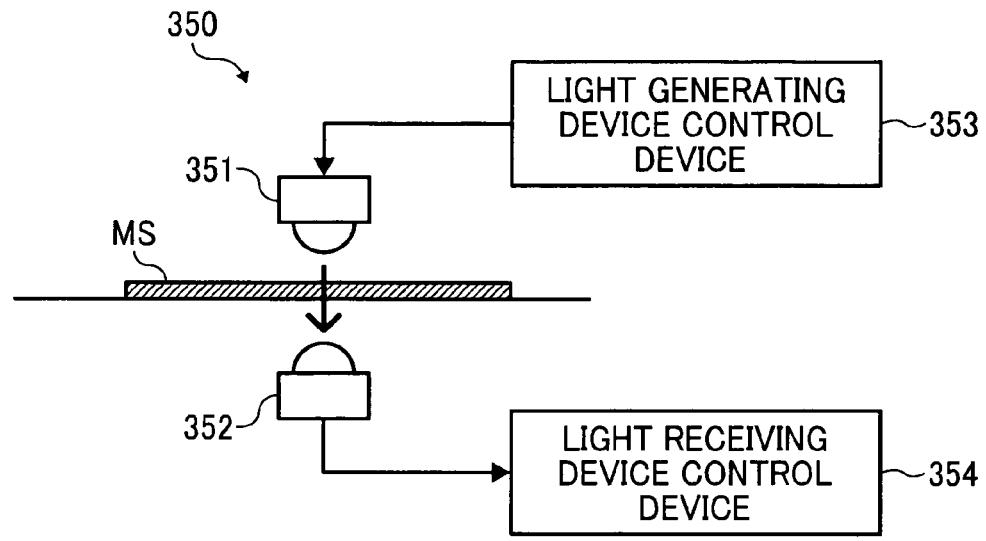
FIG. 21 illustrates an exemplary detecting device for detecting a thickness of the original document conveyed in the image reading device according to the other modification.

As shown in FIG. 21, the thickness detection device employs a transmission light intensity measuring system 350 that measures intensity of transmission light transmitting the original document. The transmission light intensity measuring system 350 includes a light generation device 351 that outputs a prescribed light intensity, a light reception device 352 that detects the light intensity, each arranged to sandwich the original document as a detection target and to measure transmission light intensity in the thickness direction of the original document. Plural control devices are connected to the light generation reception devices 351 and 352, respectively, and measure permission light intensity and specify a thickness of the original document conveyed thereto. The thickness detection device can be arranged on the original document conveyance path such as positions C and D in FIG. 17.

The above-mentioned up and down moving device has the following configuration. Specifically, a movement casing, not shown, including a drive motor, not shown, for driving the belt guide mechanism 320, the charge roller 324, the power supply 325, and the drive roller 322, is vertically movably supported on the main body cover 52 of the ADF 51. The moving device moves the belt guide mechanism 320 up and down by moving the movement casing up and down.

When the thickness of an original document on conveyance is detected by the thickness detection device at the registration section C or the turn section D, the main body control section 200 moves the belt guide mechanism up and down so that a distance from an image of the original document absorbed on the guide belt 323 to the image reading sensor 151a becomes the value L. Thus, even when the original document is thick, the original document image can be in focus, and a high quality image can be obtained.

Figure 22:
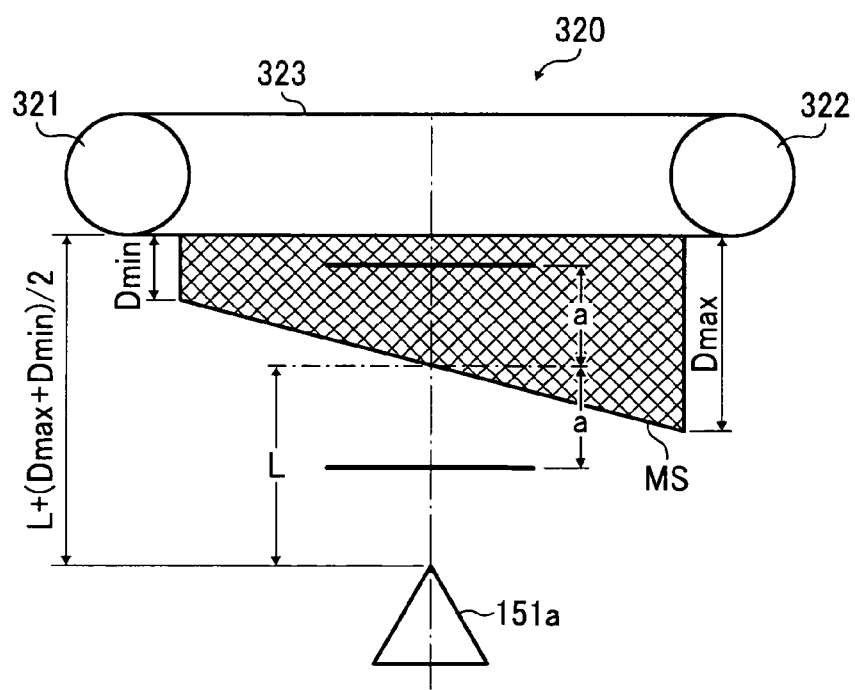
FIG. 22 illustrates exemplary guide belt moving control executed in the image reading device according to the other modification.

Further, the original document sometimes includes cut and paste portions, and the thickness is accordingly uneven in the sub scanning direction. Then, as shown in FIG. 22, the thickness detection device detects the maximum and minimum values Dmax and Dmin of the original document, respectively, and can control the belt guide 320 to move so that the distance X from the image reading sensor 151a to the guide belt 323 meets the following formula:

$$L+\{(Dmax+Dmin)/2\}$$

Further, when the sum of Dmax+Dmin is larger than the depth of focus "2a", there exists a section not focused. Thus, in such a situation, alarm is generated and messages indicating that whether or not reading is continued are displayed on a display, not shown.

Further, thickness information of the original document can be detected at few points and are averaged. In such a situation, the belt guide mechanism 320 is controlled to move so that the distance X from the image reading sensor 151a to the guide belt 323 meets the following formula:

$$X=L+\{(D1+D2+\ldots Dn)/2\}$$

When the length of the original document in the sub scan direction is long, a detection number n is reached and the distance X is calculated, so that movement of the belt guide mechanism 320 is controlled, before the trailing end of the original document is detected Further, in accordance with the thickness of the original document, belt guide mechanism 320 can be linearly moved. Specifically, when a section thicker than the other section due to the cut and paste arrives at the reading position, the belt guide mechanism 320 is lifted upward. When the thicker section passes through the reading position, the belt guide mechanism 320 is moved downward. Thus, the image reading sensor 151a can always be focused on the original document image, and a high quality image can be obtained.

Figure 23:
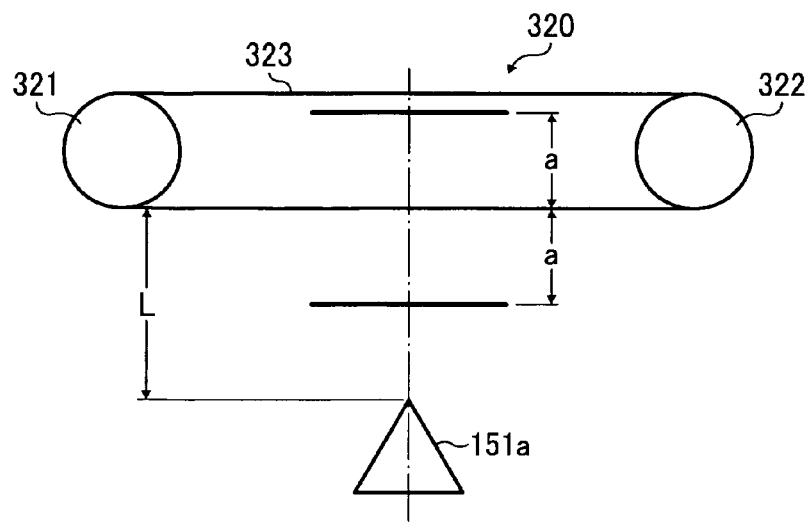
FIG. 23 illustrates another exemplary guide belt moving control executed when shading correction is executed in the image reading device according to the other modification.

Further, light intensity sometime changes or brightness thereof sometime becomes uneven as time elapses depending on types of the light source 151a and 151c. Then, to correct these changes and unevenness, shading correction is generally executed. The shading correction is generally executed using a white plate arranged at one end of the platen glass 154. Specifically, a fixed type first surface reading section 151 is arranged opposing the white plate and reads thereof. The shading correction is then executed based on the data read by the fixed type first surface reading section 151. The image reading sensor 151a is in focus in the vicinity of the guide belt and is not on the platen glass 154 in the above-mentioned embodiments. Thus, the white plate arranged at the one end section of the platen glass 154 is not focused. Since data of reflection light from the section not in focus is different from that in focus, a precise shading correction is impossible. Then, the white plate is withdrawn from the original document conveyance path when an image is read, and is moved to the original document conveyance pass right below the guide belt when the shading correction is executed to obtain reflection data. However, a time for moving the white plate is wasted, and as a result, the shading correction is prolonged. As a result, a number of original document processing per hour decreases if shading correction is executed every when a prescribed number of original document images has been read. In addition, a space is needed for accommodating the white plate in the deviated position, thereby the apparatus becomes mammoth Then, the guide belt 323 is painted white and is read, so that shading correction can be executed based on read data. Specifically, when shading correction is executed at a prescribed time after a prescribed number of original documents have been read, the belt guide mechanism 320 moves, so that a distance from the surface of the guide belt 323 to the image reading sensor 151a corresponds to the value L starting from the image reading sensor 151a to the focal point as shown in FIG. 23. Then, a light is emitted to the surface of the guide belt, and a reflection light therefrom is read by the image reading sensor 151a to obtain shading data. Thus, shading data can be obtained from a section in focus, and accordingly, the shading correction can be precisely executed. Since the extra white plate is not needed, a number of parts can be decreased, thereby cost and space can be saved. Further, since it is enough for the guide belt 323 to slightly move up and down, the shading correction can be quickly completed.

Figure 24A:
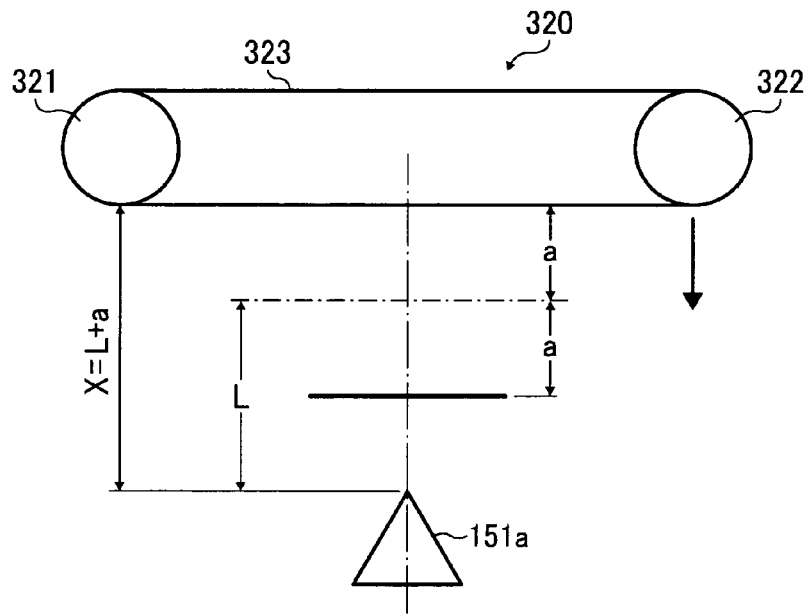
FIG. 24 illustrates yet another exemplary guide belt moving control executed when shading correction is executed in the image reading device according to the other modification.
Figure 24B:
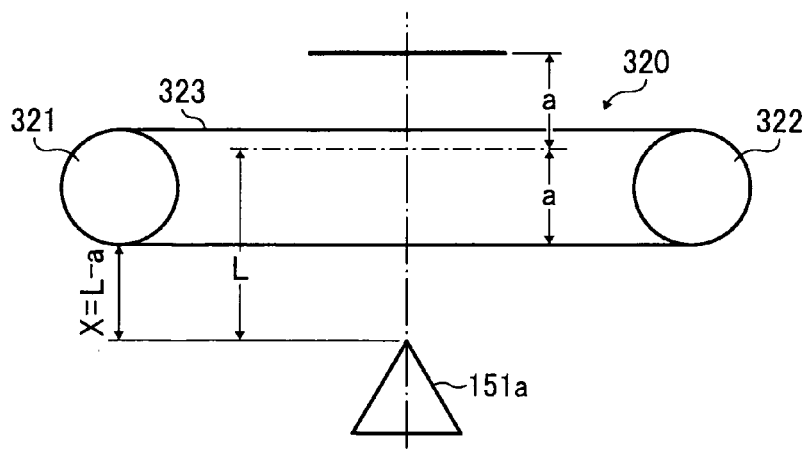

Further, the correction can be executed while the guide belt 323 is moved up and down within the depth of focus of image reading sensor 151. Otherwise, the shading correction can be executed at plural points within the depth of focus of image reading sensor 151. Specifically, when the shading correction starts, the belt guide 320 is moved so that the surface of the guide belt 323 comes to the upper limit of the depth of focus as shown in FIG. 24A. Then, the belt guide mechanism 320 is moved so that the surface of the guide belt 323 comes to the lower limit of the depth of focus as shown in FIG. 24B. Thus, the shading correction data can be obtained within the depth of focus of image reading sensor 151a. As a result, even when the thickness of the original document is uneven, the shading correction can be executed precisely at plural positions by cooperating with the thickness detection device, so that a high quality read image can be obtained.

Figure 18:
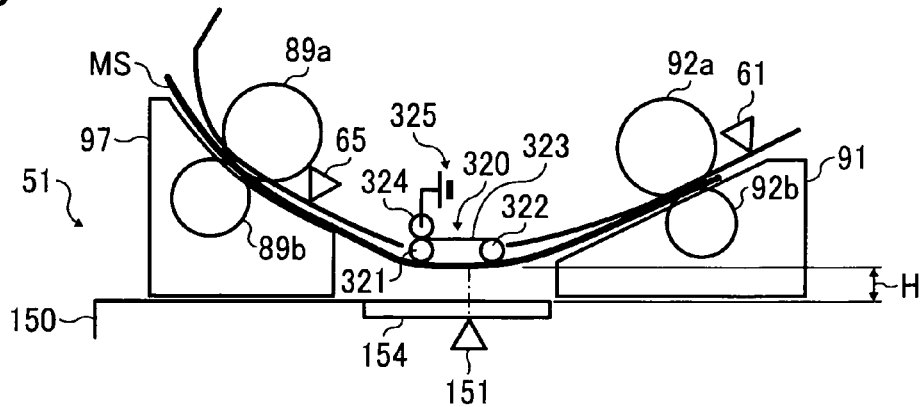
FIG. 18 illustrates exemplary surroundings of the fixed reading section for the first surface according to the other modification.
Figure 25:
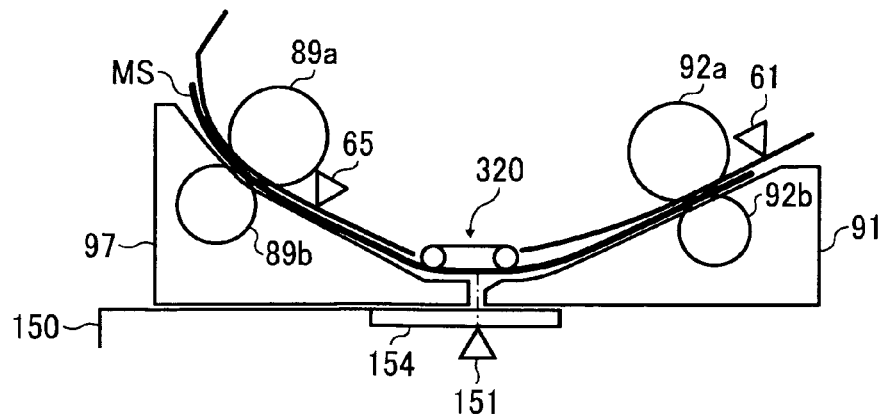
FIG. 25 illustrates an exemplary image reading device that includes a slit state gap between the up and downstream side guide members according to the other modification.
Figure 26:
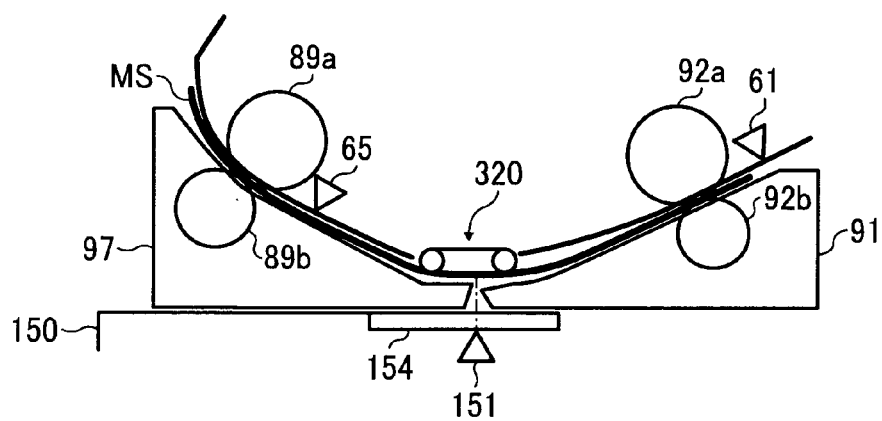
FIG. 26 illustrates another exemplary image reading device that includes a slit state gap having a tapered portion extending toward the platen glass between the up and downstream side guide members according to the other modification.
Figure 27:
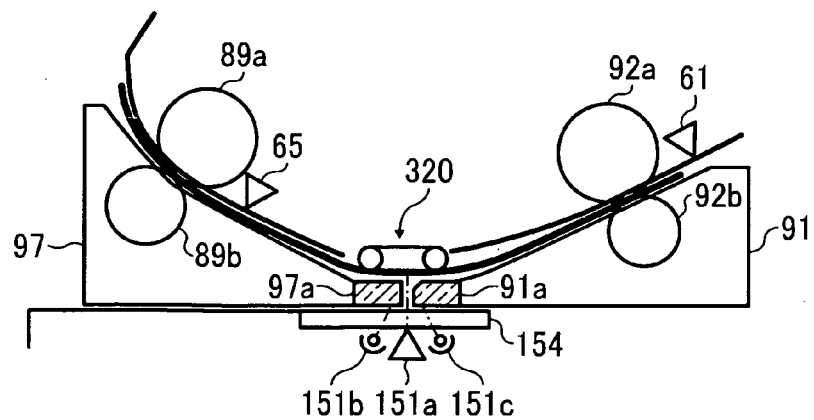
FIG. 27 illustrates another exemplary image reading device that includes up and downstream side guide members each partially having a transparent portion around a reading position according to the other modification.
Figure 28:
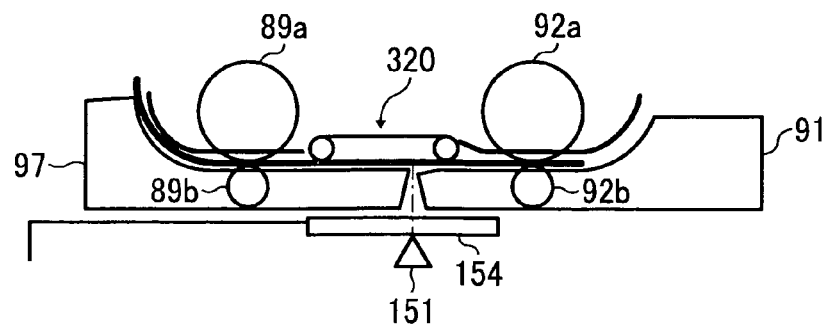
FIG. 28 illustrates another exemplary image reading device having a conveyance path extending in parallel to the platen glass from a reading inlet roller pair to a reading outlet roller pair according to the other modification.

Further, due to the shape as shown in FIG. 18, the original document is conveyed not being absorbed to the guide belt 323 for some reason, the original document likely collides with the end section of the downstream side guide member 91. Thus, as shown in FIG. 25, similar to that shown in FIG. 10, a gap between the up and downstream side guide members 97 and 91 can be a slit state. As a result, even when the original document is not absorbed to the guide belt 323, the original document is preferably conveyed being guided by the up and downstream side guide members 97 and 91. Further, the dust or paper powder attracting to the original document can be suppressed to drop at the reading position of the platen glass 154. Further, as shown in FIG. 26, the gap can be the taper shape with its diameter expanding toward the platen glass 154. Further, the up and downstream side guide members 97 and 91 can be totally or partially transparent at around the reading position as shown in FIG. 27. Further, as shown in FIG. 28, the conveyance path from the reading inlet roller pair 89 to the reading outlet roller pair 92 can be parallel to the surface of the platen glass 154.

Figure 29:
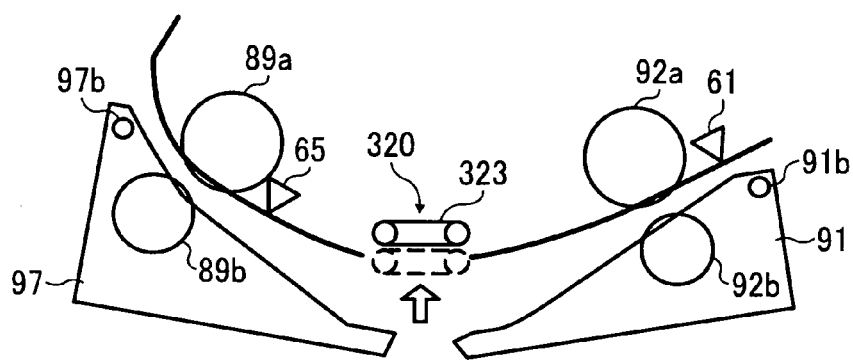
FIG. 29 illustrates another exemplary image reading device that includes up and down stream side guide members each freely swingably mounted to a body cover of the ADF according to the other modification.
Figure 30:
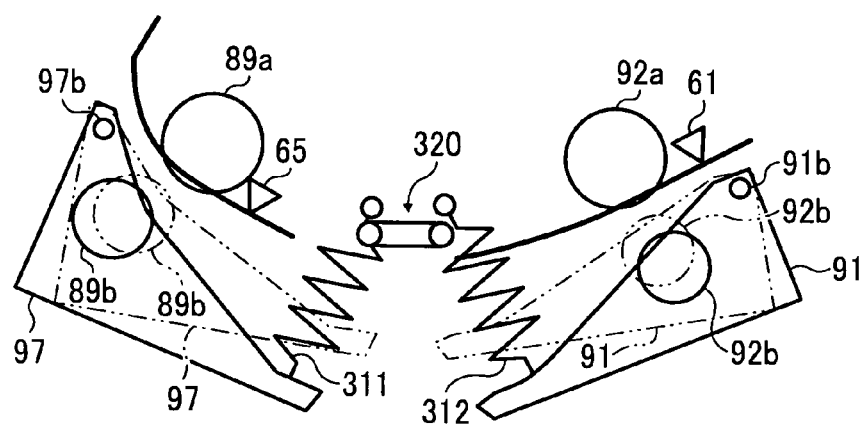
FIG. 30 illustrates another exemplary modification of the image reading device that includes springs for inhibiting the swinging of the respective up and downstream side guide members according to the other modification.

Further, as shown in FIG. 29, similar to the example as described with reference to FIG. 13, the up and downstream side guide members 97 and 91 can freely swingably be supported by the main body cover 52. Further, as shown in FIG. 30, swinging movement of the up and downstream side guide members 97 and 91 due to their own weights can be restricted by springs 311 and 312, respectively. When the ADF 51 is open and the up and downstream side guide members 97 and 91 swing due to their own weights, the guide belt is exposed. As mentioned above, when the surface of the guide belt is used in shading correction, it is not preferable that an operator touches and contaminates or cut the surface of the guide belt 323. Specifically, when the guide belt 323 is contaminated or cut, data for the shading correction is not precisely obtained therefrom resulting in deterioration of a read image. Thus, when the ADF 51 is open, the belt guide mechanism 320 is moved and deviated upward as shown in FIG. 29. As a result, since the guide belt 323 is deviated to a rear side section, the operator is prevented from carelessly touching the guide belt 323. As a result, the surface of the guide belt can suppress its contamination or cut.

The guide belt 323 is also preferably deviated to the rear side after an image reading operation is completed to stay there when the power supply is turned off and the ADF 51 is open.

As mentioned heretofore, the original document reading device 50 is a sheet through type in which an original document is conveyed to the fixed first surface reading section 151 and is read at a reading position. Specifically, the original document reading device 50 includes the ADF 51 that conveys the original document keeping a prescribed distance from the platen glass 154 at the reading position. Thus, due to the prescribed gap, the original document does not sliding contacts the platen glass 154. As a result, the dust of the like attracting to the original document does not attract to the reading position of the platen glass 154 by the sliding contact. Further, the original document reading device 50 arranges the platen glass 154 outside the depth of focus of the fixed first surface reading section 151. Thus, even attracting to the reading position of the platen glass 154, dust or the like almost blurs when read. Otherwise, the dust or the like only causes a thin blurring line on the read image. Accordingly, the line caused by the dust or the like on the reading position cannot be noticeable in comparison with a case when the platen glass 154 is arranged within the depth of focus at the fixed first surface reading section 151.

Further, according to the image reading device of the modification, the ADF 51 includes a guide belt 323, the surface of which opposing the contact glass 154 at the reading position moves in an original document conveyance direction, and an absorption device that attracts the original document to the guide belt 323. Thus, the original document attracts to the guide belt 323 and is conveyed. Accordingly, a change of the distance from the image of the original document to the fixed first surface reading section at the reading position can be prevented and the original document image is not deviated from the depth of focus at the fixed first surface reading section. As a result, a high quality image can be obtained as a result of reading.

Further, by absorbing the original document to the guide belt 323 with electrostatic attraction force of the charge device, the original document is absorbed and conveyed by the guide belt 323.

Further, by absorbing the original document to the guide belt 323 with air suction attraction force of the absorption device, the original document is also absorbed and is conveyed by to the guide belt 323.

The image reading device of the modification causes the guide belt 323 to move vertically in accordance with a detection result of the thickness detection device. Thus, even when a thick original document or a thickness uneven original document in the sub scanning direction is used, the original document can be conveyed with its image surface entering the depth of focus of the fixed first surface reading section 151. As a result, even when the thick original document or the thickness uneven original document in the sub scanning direction is used, a high quality image can be obtained.

Further, since the image reading device of the modification executes shading using the surface of the guide belt 323, the white plate can be omitted. Thus, a number of parts can be decreased, and accordingly, the apparatus can be downsized saving cost. Further, by vertically shifting the guide belt 323 during a shading operation, the surface of the guide belt 323 can be focused on the fixed first surface reading section. Otherwise, data for shading use can be obtained at each of positions within a range of the depth of focus at the fixed first surface reading section. As a result, the shading operation can be precise.

Further, since the guide belt 323 is shifted separating from the platen glass 154 when exposed, the operator is prevented from improperly touching and making the cut and stein on the guide belt 323.

Further more, since the guide belt 323 is shifted separating from the platen glass 154 when a reading operation is completed, the operator is prevented from improperly touching and making cut and stein on the guide belt 323.

Further, the ADF 51 includes a upstream side guide member 97 arranged adjacent and upstream of the reading position to constitute the lower surface of the original document conveyance path, and a down stream side guide member 91 arranged adjacent and down stream of the reading position to constitute the lower surface of the original document conveyance path. In addition, the gap between the up and the downstream side guide members 97 and 91 is adjusted to be larger than that needed for the fixed first surface reading section 151 to read an original document image, and is adjusted to be less than that where the original document conveyance path does not deviate from the depth of focus at the reading position. Accordingly, a high quality image can be obtained.

Further, by making the gap between the up and downstream side guide members 97 and 91 like a slit, the general dust and paper dust attracting to the original document on conveyance can be suppressed to drop onto the platen glass.

Further, by making the gap between the up and down stream side guide members 97 and 91 like a taper, a diameter of which increases toward the platen glass 154, the gap can be more narrowed on the original document conveyance path side. Thus, the general dust and paper dust attracting to the original document on conveyance can be suppressed to drop onto the platen glass without interfering the light at the fixed first surface reading section.

The up and downstream side guide members 97 and 91 are attached to the main body cover 52 that includes the upper side guide members opposing to the respective of those. Thus, different from a system in which the up and down stream side guide members 97 and 91 are arranged on another casing than the upper side guide member, accumulation of parts allowances can be suppressed. Thus, the interval between the upper side guide member and the original document conveyance path hardly increases, and thus the original document conveyance path rarely changes. Otherwise, the interval therebetween hardly decreases, and thus sheet jam rarely occurs.

Further, since one of the up and downstream side guide members 97 and 91 is attached to the main body cover 52, the original document conveyance path can be exposed when the ADF is open and none of the up and down stream side guide members 97 and 91 swings in a prescribed direction. Thus, the original document jamming in the vicinity of the reading position can be readily removed.

Further, since one of the up and down stream side guide members 97 and 91 automatically swings when the ADF 51 is open, the original document jamming in the vicinity of the reading position can be more readily removed than when manually swinging thereof.

Further, a restriction device is arranged to restrict the up and downstream side guide members 97 and 91 not to swing more than a prescribed level in relation to the main body cover 52. Thus, when the ADF 51 is closed, the lower surface of the guide member contacts the upper surface of the scanner, and accordingly, the ADF 51 highly precisely swings in a direction to close the original document conveyance path.

Further, positioning protrusions are arranged opposing to the upper side guide members contacting thereto to execute positioning when the ADF 51 is closed. Thus, a prescribed interval can be maintained between the guide members and the upper side guides, so that a stable original document conveyance can be achieved.

Further, since the up and downstream side guide members 97 and 91 are transparent, the light generated by the fixed first surface reading section can be emitted onto the original document image even if these guides are arranged on the light path extending from the fixed first surface reading section. Thus, the gap between these guides 97 and 91 can be more narrowed, so that a dust or the like is more efficiently suppressed to drop on the platen glass 154.

Further, since the up and down stream side guide members 97 and 91 are partially transparent in the vicinity of the reading position in the entire main scanning direction, the gap between these guides 97 and 91 can be yet more narrowed and suppress the light emitted from other than the fixed first surface reading section to enter. As a result, block color correction can be more precisely executed.

Further, a conveyance path starting from a reading inlet roller pair 89 arranged at the most down stream side among the conveyance roller pair arranged upstream of the reading position to a reading outlet roller pair 92 arranged most upstream side among the conveyance roller pair arranged down stream of the reading position is formed in parallel to the platen glass 154. Thus, behavior of the original document on conveyance can be appropriately controlled at the reading position, so that a high quality image can be obtained as a result of reading.

Further, since the copier of the several embodiments includes the original document reading device, a high quality image can be copied.

Advantage

According to one typical embodiment of the present invention, the original document does not slide contacts the platen glass, and accordingly, dust or the like attracting to the original document does not attract thereto.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An image reading system for reading an image of an original document, comprising:
    a feeding device configured to feed an original document toward a reading position; and
    a conveyance device configured to convey the original document through the reading position on a platen glass in a scanning process, said conveyance device keeping a prescribed distance between the original document and the platen glass during the scanning process, wherein said conveyance device includes
        a guide belt configured to travel in a prescribed direction with its surface facing the platen glass at the reading position; and
        an absorption device configured to absorb the original document to the guide belt; and
    wherein said platen glass is arranged outside a depth of focus.

2. The image reading system as claimed in claim 1, wherein said absorption device employs electrostatic attracting force.

3. The image reading device as claimed in claim 1, wherein said absorption device employs air suction force.

4. The image reading system as claimed in claim 1, further including:
- a first elevation device configured to elevate the guide belt to a prescribed first height from the platen glass; and
- a thickness detection device configured to detect a thickness of the original document;
- wherein said guide belt is elevated and lowered in accordance with an output of the detection device.

5. The image reading system as claimed in claim 1, further including a second elevation device configured to elevate the guide belt to a prescribed second height from the platen glass when a shading correction operation is executed using the surface of the guide belt.

6. The image reading system as claimed in claim 5, wherein the guide belt is retracted inside the image reading system when the guide belt is exposed.

7. The image reading system as claimed in claim 5, wherein the guide belt is retracted inside the image reading system when the scanning process is completed.

8. The image reading system as claimed in claim 1, wherein the conveyance device further including:
- an up stream side guide member arranged up stream of the reading position, said up stream side guide member including a pair of upper and lower guide plates collectively constituting an upstream side conveyance path; and
- a down stream side guide member arranged downstream of the reading position, said downstream side guide member including a pair of upper and lower guide plates collectively constituting a downstream side conveyance path;
- wherein a horizontal gap having a prescribed size is formed between the lower guide plates of the respective up and downstream side guide members, said prescribed size enabling to read the original document within the depth of focus.

9. The image reading system as claimed in claim 8, wherein the horizontal gap is a slit shape.

10. The image reading system as claimed in claim 8, wherein the horizontal gap is a taper shape, a diameter of said taper shape increasing toward the platen glass.

11. The image reading system as claimed in claim 8, further comprising a casing configured to swingably support the image reading system, wherein said upper guide plates of the respective up and downstream side guide members are attached to the casing.

12. The image reading system as claimed in claim 11, wherein said casing is swingable from and to the platen glass, wherein said up stream side guide member is swingable from and to the casing.

13. The image reading system as claimed in claim 12, wherein said up stream side guide member swings by its own weight when the casing is open.

14. The image reading system as claimed in claim 13, further comprising a swing restriction device configured to restrict swinging of said up stream side guide member.

15. The image reading system as claimed in claim 11, further comprising a positioning protrusion attached to the casing, said positioning protrusion being configured to contact and position said up stream side guide member at a prescribed level when the casing is closed.

16. The image reading system as claimed in claim 8, wherein said up and downstream side guide members are substantially entirely transparent.

17. The image reading system as claimed in claim 8, wherein said up and downstream side guide members are partially transparent in the vicinity of the reading position in a main scanning direction.

18. The image reading system as claimed in claim 17, wherein said conveyance device includes;
- at least two pairs of driving and driven rollers arranged over the original document conveyance path,
- wherein a conveyance path starting from the most downstream side pair of conveyance rollers arranged up stream of the reading position to the most up stream side pair of the conveyance rollers arranged downstream of the reading position is formed in parallel to the surface of the platen glass.

19. A copier for copying an original document, comprising:
- an image formation device configured to form an image on a printing member; and
- an original document reading device configured to convey and read an image of an original document;
- wherein said original document reading device includes the image reading system as claimed in claim 1.

* * * * *